United States Patent [19]
Fujii et al.

[11] Patent Number: 5,520,051
[45] Date of Patent: May 28, 1996

[54] STRAIN SENSING DEVICE

[75] Inventors: Tetsuo Fujii, Toyohashi; Yoshitaka Gotoh, Ichinomiya; Susumu Kuroyanagi, Anjo, all of Japan

[73] Assignee: Nippondenso Co., Ltd., Kariya, Japan

[21] Appl. No.: 249,082

[22] Filed: May 25, 1994

Related U.S. Application Data

[63] Continuation of Ser. No. 62,720, May 18, 1993, abandoned, which is a continuation of Ser. No. 589,432, Sep. 27, 1990, abandoned.

[30] Foreign Application Priority Data

Sep. 27, 1989 [JP] Japan .................................. 1-251624

[51] Int. Cl.$^6$ ............................................. G01P 15/12
[52] U.S. Cl. .................................... 73/514.36; 338/5
[58] Field of Search ........................ 73/517 R, 514, 73/862.65, 862.382, 862.627, 862.632, 862.634; 338/2, 5

[56] References Cited

U.S. PATENT DOCUMENTS

| | | | |
|---|---|---|---|
| 4,306,456 | 12/1981 | Maerfeld | 73/517 R |
| 4,809,552 | 3/1989 | Johnson | 73/517 R |
| 4,848,157 | 7/1989 | Kobayashi | 338/5 |
| 4,882,933 | 11/1989 | Petersen et al. | 73/517 R |
| 4,891,985 | 1/1990 | Glenn | 73/517 R |
| 5,060,504 | 10/1991 | White et al. | 73/517 R |
| 5,081,867 | 1/1992 | Yamada | 73/517 R |

FOREIGN PATENT DOCUMENTS

| | | |
|---|---|---|
| 49-100986 | 9/1974 | Japan . |
| 50-149070 | 12/1975 | Japan . |
| 60-138977 | 7/1985 | Japan . |
| 61-84537 | 4/1986 | Japan . |
| 61-144576 | 7/1986 | Japan . |
| 61-144576 | 7/1986 | Japan . |
| 63-76485 | 4/1988 | Japan . |
| 63-076485 | 4/1988 | Japan . |
| 63-291480 | 11/1988 | Japan . |
| 01014711 | 3/1989 | Japan . |
| 1-14711 | 3/1989 | Japan . |

OTHER PUBLICATIONS

C. L. Gravel, "Subminiature Solid State Accelerometer," *Proc. of the 15th International ISA Aerospace Instrumentation Symposium*, May 5–7, 1969, pp. 368–372.

*Technical Digest of the 8th Sensor Symposium*, May 10–11, 1989, Yamada et al., "Structure Analysis for an Accelerometer," pp. 45–48.

*Proceedings of the Second International Forum on ASIC and Transducer Technology*, Apr. 9–12, 1989, Mallon et al., "Silicon Sensors and Microstructures: Technology of Today," pp. 87–92.

Primary Examiner—John E. Chapman
Attorney, Agent, or Firm—Cushman, Darby & Cushman

[57] ABSTRACT

Device including a strain generating portion supported at least at one end on a substrate and formed in a displaceable manner with respect to the substrate in a cavity of the substrate. A semiconductor strain sensing element, which is disposed at the strain generating portion, detects the amount of strain of the strain generating portion. A support is disposed at a connection point between the strain generating portion and the substrate so as to reinforce the connection point.

27 Claims, 24 Drawing Sheets

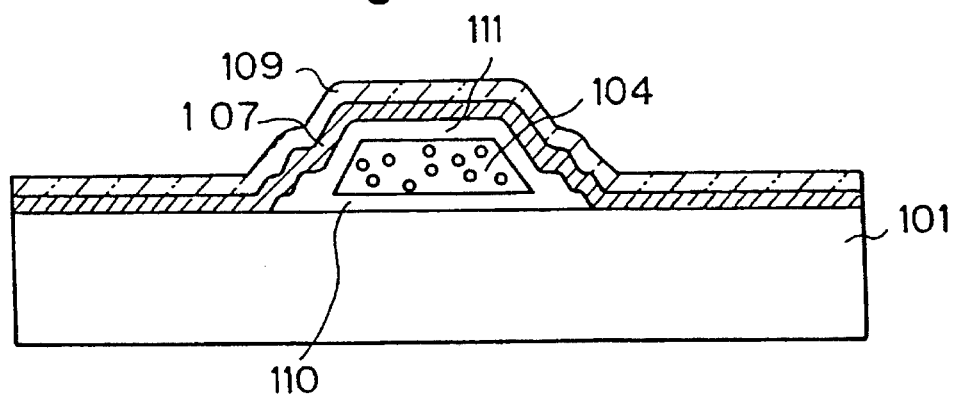
Fig. I(a)
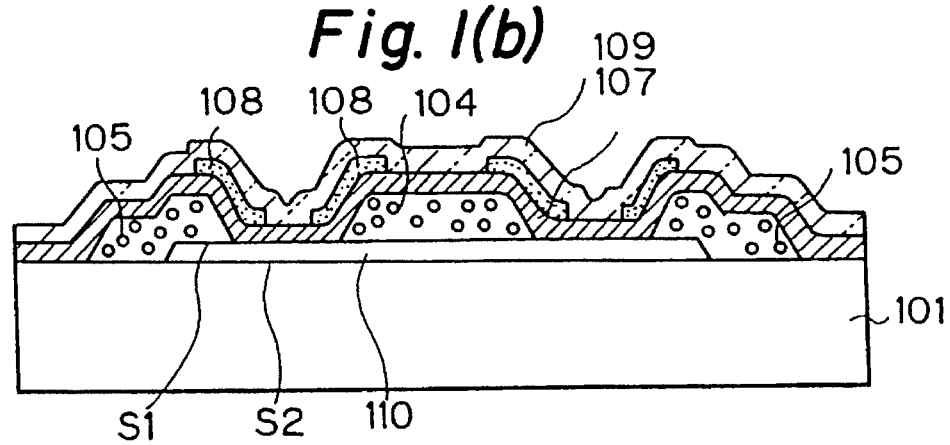
Fig. I(b)
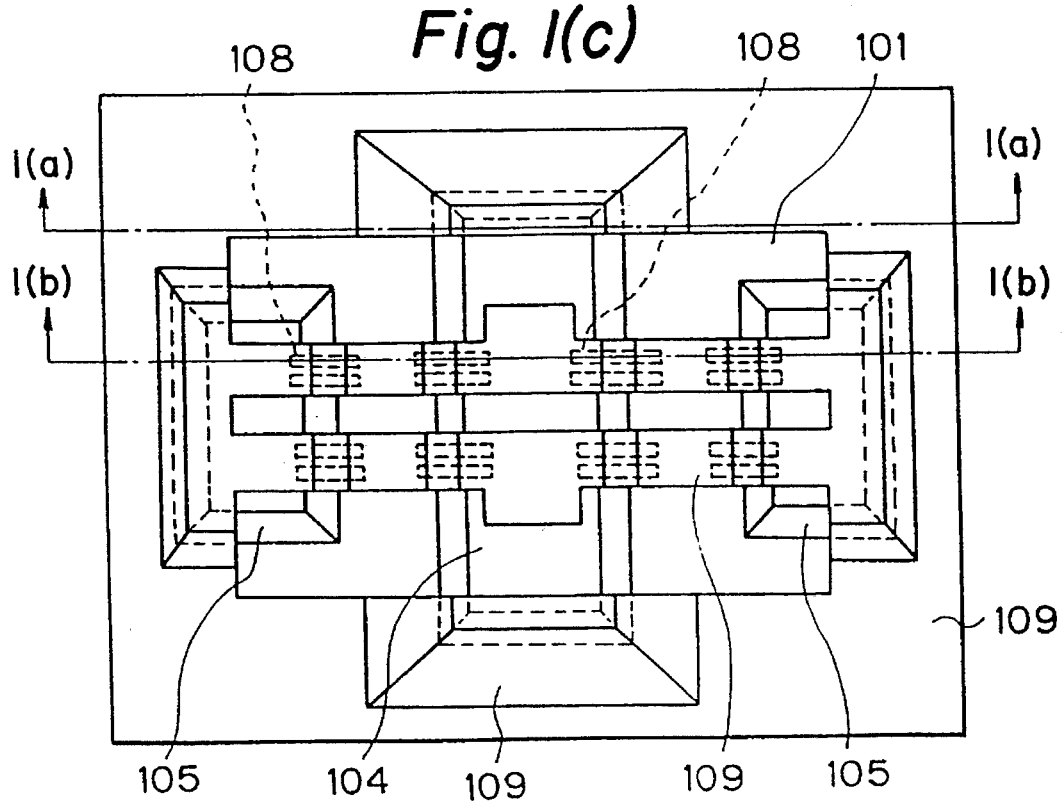
Fig. I(c)

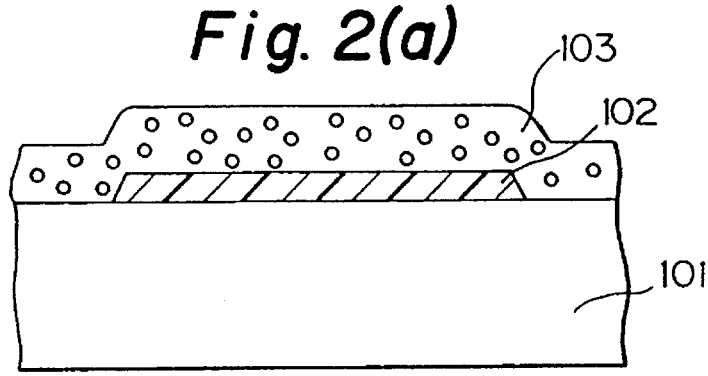
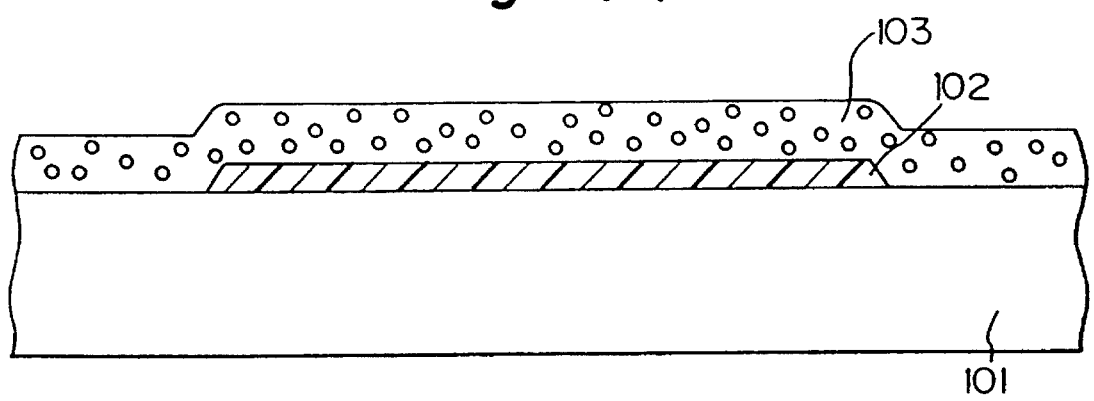

Fig. 6(a)
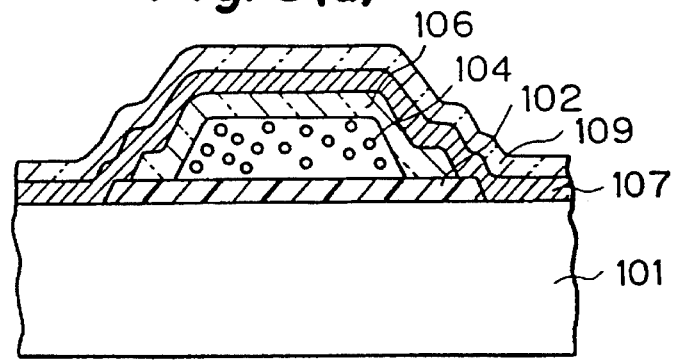
Fig. 6(b)
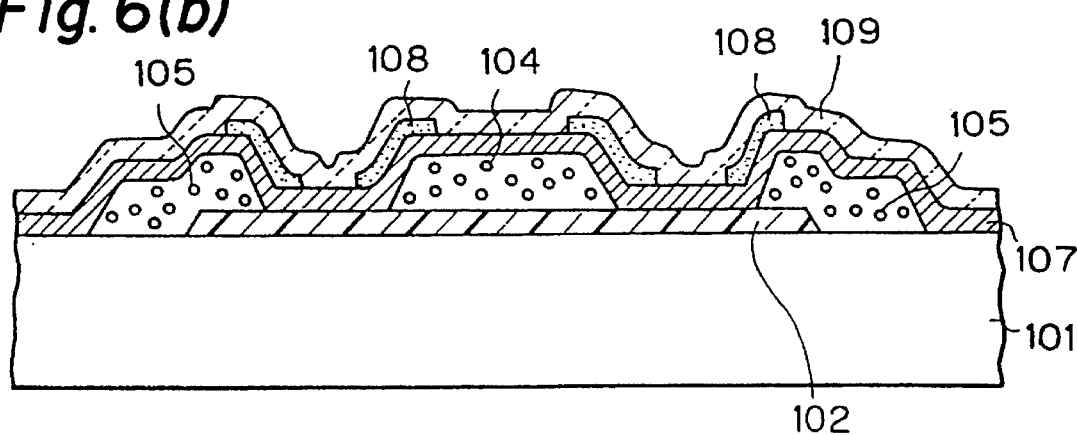
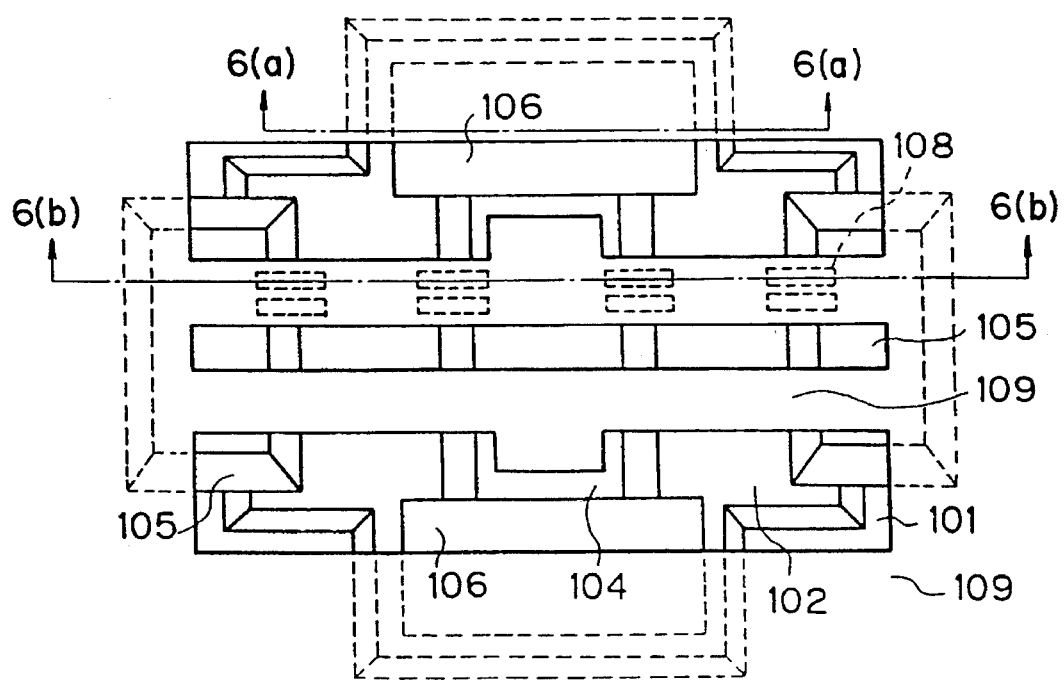
Fig. 6(c)

STRAIN SENSING DEVICE

This is a continuation of application Ser. No. 08/062,720 filed on May 18, 1993, abandoned, which is a continuation of application Ser. No. 07/589,432 filed on Sep. 27, 1990, also abandoned.

BACKGROUND OF THE INVENTION

1. Field of the Invention

The present invention relates to a strain sensing device such as an acceleration sensor or a pressure sensor.

2. Description of the Related Art

In a usual acceleration sensor, a weight displaces upon acceleration. A stopper is provided in the direction of that displacement in the range of possible displacement of the weight. Even with large movement of the weight due to excessive acceleration, the stopper ensures that the displacement can be stopped, thereby preventing breakage of the strain generating portion, which is made of thin material.

At the present time, however, this stopper is attached to the sensor portion at a final stage of its manufacture, and no consideration has been given at all to prevention of breakage of the thin portion due to vibration etc. acting on the weight during the process of manufacture of the thin portion of the sensor.

Note in this regard that in order to enable the acceleration sensor to detect minute acceleration, the beam on which the strain gauge device is placed is generally made thin. This enables the amount of displacement of the weight, which displaces along with acceleration, to be detected with a high sensitivity. The same is true in a pressure sensor. To increase the sensitivity, the general practice is to make the diaphragm thinner.

In other words, to obtain higher sensitivity in such strain sensing devices, the beam, diaphragm, and other strain generating portions need only be made thinner. This thinning, however, ends up causing a reduction in the mechanical strength vis-a-vis vibration or excess stress.

In recent years, demand has been growing for making the sensor portion of such strain sensing devices and the IC circuit portion for processing the output signals from the sensor portion on the same chip so as to achieve superminiaturized strain sensing devices. Along with this reduction in size of the devices, the strain sensing portions have to be made increasingly thinner, which will further aggravate the problem of the reduction of strength at such portions. In particular, it is expected that there will be remarkably more breakage of the thin portions due to vibration etc. during the process of manufacture.

Therefore, the present inventors thought of fabricating a supersmall type strain sensing device by a film construction using conventional IC processes and took note of the construction of the stopper in the process of manufacture of the sensing devices.

In this regard, note that when a sensor portion and IC circuit portion are made on a single chip, the sensor portion, i.e., the strain sensing device, has a movable strain sensing portion and therefore requires that a cavity be formed in the sensor portion during the process of its manufacture.

In conventional IC processes, when a cavity is formed in a substrate, contaminants, dust, chemicals, etc. tend to accumulate in the cavity. When high temperature processes are required, in particular, these contaminants etc. adhering to the substrate can cause contamination of the manufacturing apparatuses and can spread in the substrate to cause deterioration of the properties of the IC portion.

The present invention was made in consideration of all of the above and has as its object the provision of a supersmall strain sensing device which offers a high sensitivity and which is free from breakage of the strain generating portion and, further, the provision of a method of manufacture enabling the strain sensing device to be manufactured with a good precision without breakage of the strain generating portion during the process of manufacturer and without being affected by contaminants etc.

SUMMARY OF THE INVENTION

To resolve the above problems, according to one aspect of the present invention, there is provided a strain sensing device including a strain generating portion supported at least at one end on a substrate and formed in a displaceable manner with respect to the substrate in a cavity of the substrate, a semiconductor strain sensing element which is disposed at the strain generating portion and detects the amount of strain of the strain generating portion; and a support which is disposed at a connection point between the strain generating portion and the substrate so as to reinforce the connection point, the connection point having a side face portion inclined with respect to the substrate.

According to another aspect of the present invention, there is provided a strain sensing device comprised of a depression formed at a main surface of a substrate, a strain generating portion supported at least at one end on the substrate, a weight formed in the depression, movable with respect to the substrate by the strain generating portion, and acting on the strain generating portion, and a semiconductor strain sensing element which is disposed at the strain generating portion and detects an amount of strain of the strain generating portion by displacement of the weight, a cavity being set between the weight and the strain generating portion, a distance from a connection point with the substrate at the strain generating portion to a connection point with the weight being made larger by a length determined by a size of the cavity.

According to still another aspect of the invention, there is provided a strain sensing device comprised of a substrate, a strain sensing portion supported at least at one end on the substrate, forming a cavity with the substrate, and held in a movable fashion with respect to the cavity, a semiconductor strain sensing element which is disposed at the strain generating portion and detects an amount of strain of the strain generating portion, and a support which is disposed at a connection point of the strain generating portion with the substrate, the connection point constructed so that the strain generating portion gradually increases in thickness, the connection point of the strain generating portion thereby being reinforced.

According to still another aspect of the invention, there is provided a method of manufacturing a strain sensing device comprising a first step of depositing a first film on a predetermined region on a surface of a substrate, a second step of depositing a second film on the substrate so as to cover the first film and thereby bury the first film, a third step of forming a semiconductor strain sensing element at a predetermined position of the second film, a fourth step of exposing the first film from the second film in a predetermined pattern so as to separate the second film into a strain generating portion region where the semiconductor strain sensing element is formed and an exposure region where the first film is exposed, and a fifth step of selectively removing the first film from the exposure region, forming a cavity between the substrate and the second film, defined by the thickness of the first film, and making the second film made the strain generating portion region movable with respect to the substrate, the range of displacement of the strain generating portion region in the direction of the substrate being limited by the cavity.

According to still another aspect of the invention, there is provided a method of manufacturing a strain sensing device comprising a first step of depositing a first film on a predetermined region on a surface of a substrate, a second step of depositing a second film on the substrate so as to cover the first film and bury the first film, a third step of forming a semiconductor strain sensing element at a predetermined position of the second film using the position directly above the first film of the same as a strain generating portion region, a fourth step of exposing the first film buried by the substrate and the second film in a predetermined pattern, and a fifth step of selectively removing the first film from the exposure region, forming a cavity between the substrate and the second film, defined by the thickness of the first film, and making the second film made the strain generating portion region movable with respect to the substrate, the movable range of the strain generating portion region in direction of the substrate being limited by the cavity.

According to still another aspect of the present invention, there is provided a method of manufacturing a strain sensing device comprising a first step of depositing a first film on a predetermined region on a main surface of a substrate and forming a peripheral portion of the first film in a smooth incline with respect to the substrate, a second step of depositing a second film having a large thickness and a predetermined thickness pattern at a predetermined position over the first film on the substrate at least at a predetermined edge of the first film and forming a semiconductor strain sensing element at a predetermined position of the second film directly over the first film, and a third step of selectively removing the first film to form a cavity between the substrate and the second film defined by the thickness of the first film, the strain generating portion comprised of the second film supported by a thicker film portion on the substrate.

According to still another aspect of the invention, there is provided a method of manufacturing a strain sensing device comprising a first step of forming a depression in a main surface of a substrate, a second step of depositing a first film having a predetermined thickness on a wall surface of the depression, a third step of filling a second film in the depression in which the first film is deposited, a fourth step of depositing a third film on the second film at least in contact with the first film, a fifth step of depositing a fourth film over the first film, the second film, and the third film on the substrate, a sixth step of patterning the fourth film to a predetermined configuration for exposing at the surface at least one of the first film and the third film, and a seventh step of selectively removing the first film and the third film to form a cavity, defined by the thickness of the third film, between the second film and the fourth film and forming a cavity, defined by the thickness of the first film, between the second film and the substrate, a weight being formed comprised of the second film supported in a movable fashion in the depression by a strain generating portion comprised of the fourth film.

According to still another aspect of the invention, there is provided a method of manufacturing a strain sensing device comprising a first step of depositing a first film on a predetermined region on a main surface of a substrate, a second step of giving a smooth incline to a peripheral edge of the first film with respect to the substrate, a third step of depositing a second film over the first film at least at a predetermined position of a peripheral edge of the first film so as to connect the main surface of the substrate to the surface of the first film, a fourth step of depositing a third film over the first film and the second film on the substrate and forming a semiconductor strain sensing element at a predetermined position of the third film directly over the first film, and a fifth step of selectively removing the first film to form a cavity between the substrate and the third film, defined by the thickness of the first film.

BRIEF DESCRIPTION OF THE DRAWINGS

FIGS. 1(a) to (c) are schematic structural diagrams of a first embodiment, with FIG. 1(a) and FIG. 1(b) respectively being an 1(a)—1(a) section and a 1(b)—1(b) section of the embodiment shown in FIG. 1(c) and FIG. 1(c) being a plane view;

FIGS. 2(a) and 2(b) are sectional views illustrating the manufacturing process for the device shown in FIG. 1(a)–1(c);

FIGS. 6(a)–6(c) views illustrating the manufacturing process for the device shown in FIG. 1(a)–1(c), with FIGS. 6(a) and 6(b) being sectional views along lines 6(a)—6(a) and 6(b)—6(b) of FIG. 6(c);

DESCRIPTION OF THE PREFERRED EMBODIMENTS

Below, an explanation will be made of the present invention based on the embodiments shown in the figures.

(First Embodiment)

FIGS. 1(a) to (c) are structural views of an acceleration sensor to which the present invention is applied. The structure of the embodiment will be explained below in the order of manufacturing steps using the section views or plane views shown in FIGS. 2 to 7.

Figure 4A:
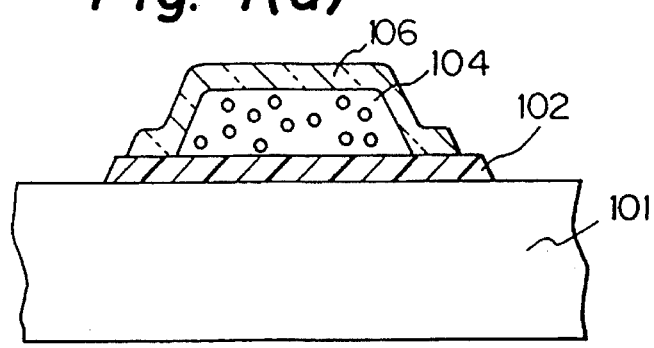
FIGS. 4(a)–4(c) views illustrating the manufacturing process for the device shown in FIG. 1(a)–1(c), with FIGS. 4(a) and 4(b) being sectional views along lines 4(a)—4(a) and 4(b)—4(b) of FIG. 4(c)
Figure 4B:
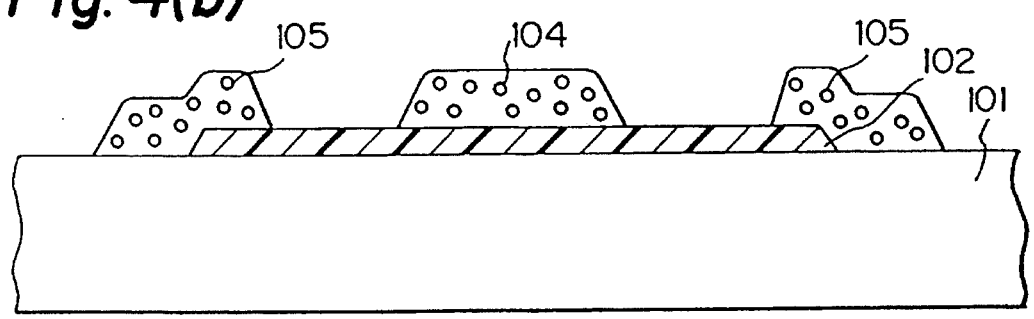
Figure 4C:
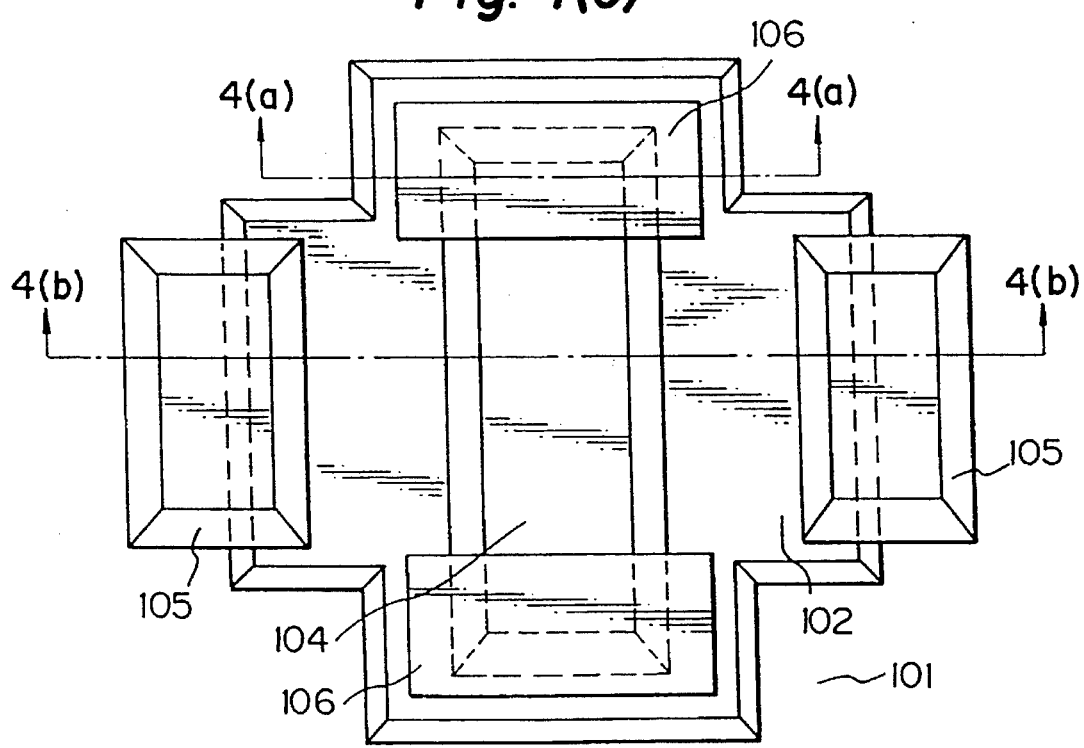

First, for example, an $SiO_2$ film 102 of about 0.5 to 2 μm thickness is formed on the surface of an n-type Si substrate having a specific resistance of 3 to 5 Ω·cm and a (100) phase direction. This is etched to make a predetermined pattern. In this embodiment, as shown in FIG. 4(c), it is patterned to a cross shape. The peripheral parts of the pattern are given a taper of 30 to 60 degrees. Note that instead of this $SiO_2$ film 102, it is possible to use, for example, a PSG film. This may be made to reflow so as to smooth the end portions. Next, a 0.5 to 20 μm thick polycrystalline silicon film 103 is deposited by the LPCVD method etc. (See FIGS. 2(a) and (b).)

Figure 3A:
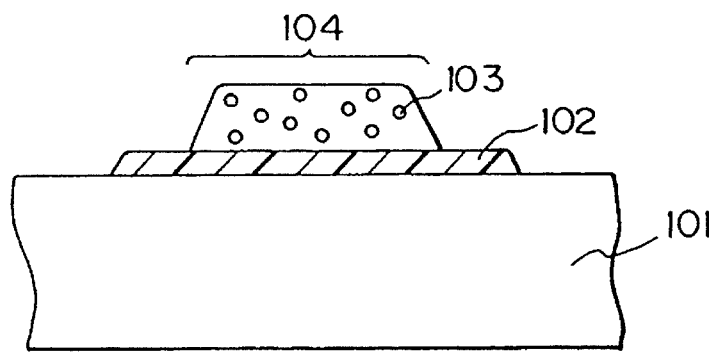
FIGS. 3(a) and 3(b) are sectional views illustrating the manufacturing process for the device shown in FIG. 1(a)–1(c)
Figure 3B:
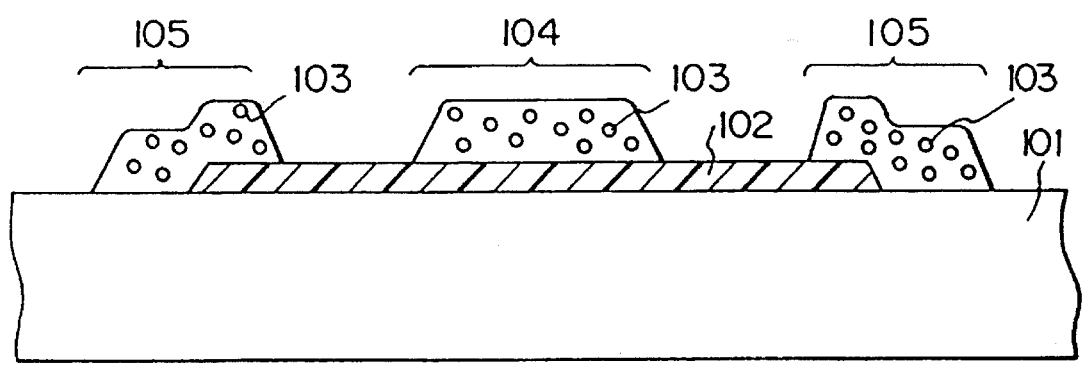

After this, photoetching is used to etch the polycrystalline silicon film 103 to the predetermined pattern configuration shown in FIG. 4(c) (see FIGS. 3(a) and (b)) so as to form the weight portion polycrystalline silicon 104 serving as the weight of the future acceleration sensor and the support portion polycrystalline silicon 105 serving as the support portion of the beam. Then a PSG film 106 is covered over everything and, as shown in FIGS. 4(a) to (c), the PSG film is patterned by photoetching. The result is the PSG film portion shown in FIG. 4(a). Note that FIG. 4(c) is a plane view of the process, while FIGS. 4(a) and (b) show an 4(a)—4(a) section and 4(b)—4(b) section of FIG. 4(c). As mentioned above, these correspond to the sectional views of FIG. 1(c).

Next, the LPCVD method is used to form an $Si_3N_4$ film 107 to a thickness of 0.02 to 1 μm, then to form a polycrystalline silicon film to a thickness of 0.02 to 0.5 μm. Ion injection is used to introduce boron, phosphorus, arsenic, and other impurities and then photoetching is used to form a piezoresistor 108 (see FIGS. 5(a) and (b)). After this, the surface is covered by the LPCVD method with an $Si_3N_4$ film, by thermal oxidizing of polycrystalline silicon with an $SiO_2$ film or by the CVD method with an $SiO_2$ film. A control hole is opened to the piezoresistor 108 and an Al wiring layer is formed, then a plasma nitrided film (hereinafter referred to as a P-SiN film) is formed to a thickness of 0.5 to 1 μm. Then, as shown in FIG. 6(c), P-SiN film 109 and the $Si_3N_4$ film 107 are photoetched to predetermined pattern configurations to expose the PSG film 106, the $SiO_2$ film 102, etc. Note that FIG. 6(c) is a plane view of the process, and that FIGS. 6(a) and 6(b) are respectively a 6(a)—6(a) sectional view and 6(b)—6(b) sectional view of FIG. 6(c).

Figure 7A:
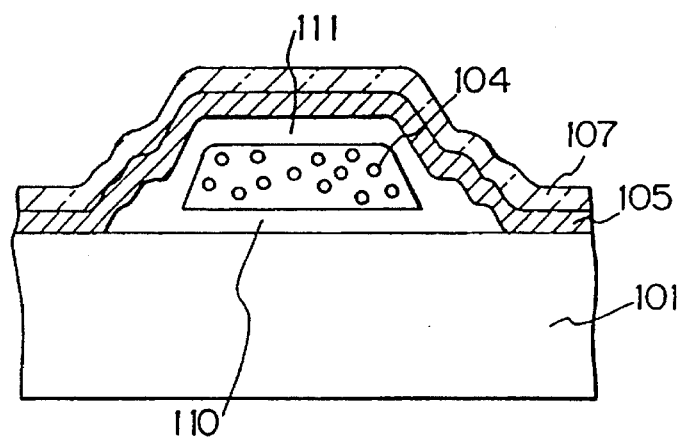
FIGS. 7(a) and 7(b) are sectional views illustrating the manufacturing process for the device shown in FIG. 1(a)–1(c)
Figure 7B:
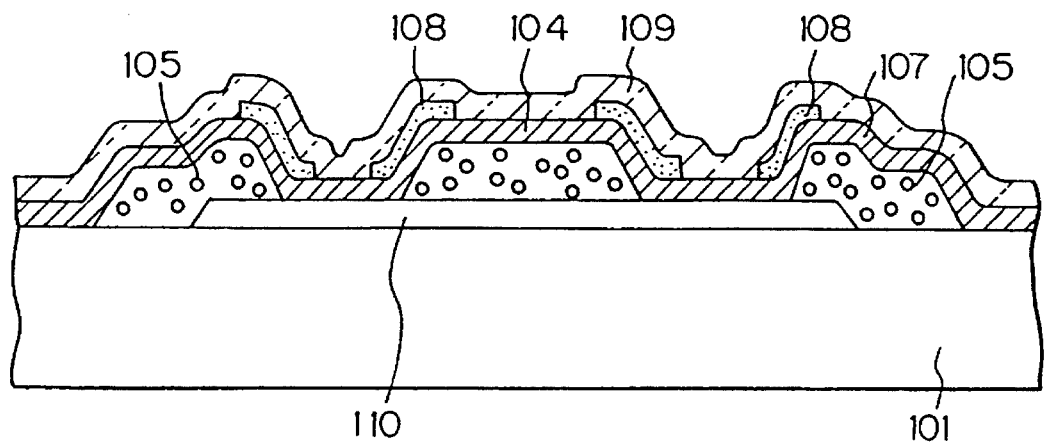

Next, an HF series etchant is used to selectively etch away the PSG film 106 and the $SiO_2$ film 102 (see FIGS. 7(a) and (b)). The removal of the $SiO_2$ film 102 and the PSG film 106 results in the formation of cavities 110 and 111 of dimensions determined by the film thicknesses and pattern configurations of the removed films, thereby producing the acceleration sensor shown in FIGS. 1(a) to (c).

That is, by the etching of the P-SiN film 109 and the $Si_3N_4$ film 107 to a predetermined pattern configuration and the selective removal of the $SiO_2$ film, as shown in FIGS. 1(b) and (c), the cavity 110 with dimensions determined by the film thickness and configuration of the $SiO_2$ film 102 is formed, and a weight portion polycrystalline silicon 104 serving as the weight portion of the acceleration sensor is supported and formed by the beam portion of the acceleration sensor formed by the P-SiN film 109 and the $Si_3N_4$ film 107. At the same time, as shown in FIGS. 1(a) and (c), the cavity 110 formed by removal of the $SiO_2$ film 102 and the cavity 111 formed by removal of the PSG film 106 allow the weight portion polycrystalline silicon 104 to be detachably formed in a movable manner. At this time, the Si substrate 101 forms the bottom stopper, with the gap distance to the bottom stopper being determined by the thickness of the $SiO_2$ film 102. On the other hand, to the P-SiN film 109 and the $Si_3N_4$ film 107 form the top stopper or the stopper with respect to movement in the lateral direction, with the gap distance to the stoppers in the vertical direction and the lateral direction being determined by the thickness of the PSG film 106. Further, the top stopper is the same P-SiN film 109 and $Si_3N_4$ film 107 which constitute the beam portion and may be formed simultaneously by patterning of the P-SiN film 109 and $Si_3N_4$ film 107. Therefore, it is possible to easily form, with good precision, the stopper position with respect to the weight portion of polycrystalline silicon 104.

The acceleration sensor of the embodiment, as shown in FIG. 1, has the base Si substrate 101 fixed by the support portion polycrystalline silicon 105 at the two ends of the beam portion. The affixing of the ends of the beam portion by the support portion, which is thicker than the beam portion, raises the strength of the beam portion and enables breakage of the beam portion to be prevented even if the beam portion is made thinner to raise the sensitivity of the sensor.

In the process shown in FIG. 2, a taper is formed at the edge portions of the pattern of the deposited $SiO_2$ film 102, so the angle at the beam ends at the point of connection of the beam, fixed to the Si substrate 101 by the support portion polycrystalline silicon 105, and the substrate becomes gentler and therefore the concentration of stress at the beam ends can be eased.

Stoppers are also formed to limit the movement of the weight of the acceleration sensor in the vertical or lateral directions. These stoppers also can prevent breakage of the beam portion. In addition, the gap distance of the stoppers can be freely set for individual substrates by the thickness of the $SiO_2$ film or the PSG film, therefore enabling mass manufacture of products with the same accuracy.

Since the cavity 110, which easily accumulates contaminants, dust, chemicals, etc. in the manufacturing process, is formed at the end of the wafer process, it is possible to make the products stably in the wafer state. In particular, in high temperature processes, there is the problem of contamination of the manufacturing apparatus due to the contaminants etc. adhering to the substrate and of dispersion of contaminants in the substrate. By the process of the present embodiment, however, no cavity is formed at the time of the high temperature process, so it is possible to prevent the above problems.

Also, according to the present invention, as shown in FIG. 1(b), the surface S1 formed by the beam portions 107 and 109, and the weight portion 104 is formed as a smooth surface roughly parallel to the main surface S2 of the Si substrate 101, so it is easier to set the distance between the surface S1 and the surface S2 with greater precision than in the case where the surface S1 were rough.

Figure 5A:
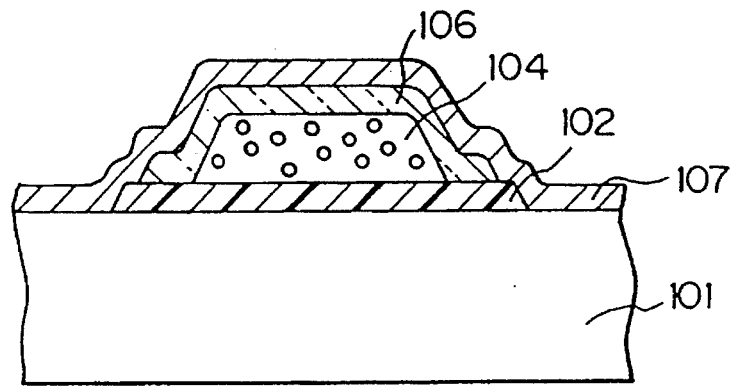
FIGS. 5(a) and 5(b) are sectional views illustrating the manufacturing process for the device shown in FIG. 1(a)–1(c)
Figure 5B:
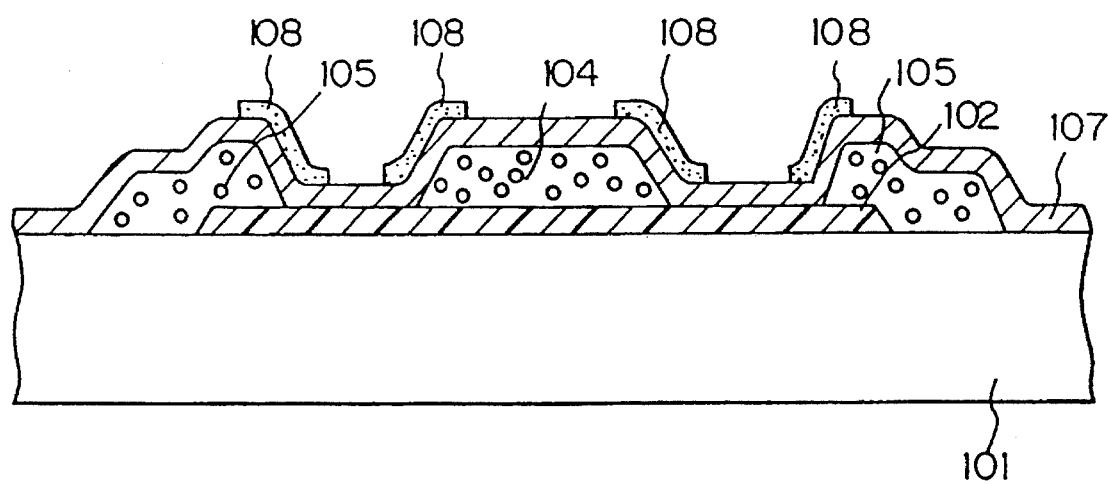

Note that in the present embodiment, when forming the piezoresistor 108 in the process shown in FIG. 5, the polycrystalline silicon film is etched so that it remains only at the position where the piezoresistor is scheduled to be formed and then the piezoresistor 108 is formed, but if film is left at the portion of the top stopper as well, it is possible to form the top stopper portion that much thicker and therefore further increase the strength of the top stopper.

Further, the present embodiment improves the strength by firmly fixing the thin beam portions on the substrate by the thick support portion, but various modifications of the shape are possible to the extent that this object is still achieved. For example, the above embodiment was constructed as a so-called double support structure, but the invention is not limited to this and use may be made of a cantilever type or a three-directional, four-directional, or other multidirectional support. Further, the pattern configurations of the $SiO_2$ film 102, PSG film 106, and polycrystalline silicon layer 103 and the etching patterns of the P-SiN film 109 and $Si_3N_4$ film 107 etc. are not limited to those mentioned above, but may be other configurations as well, needless to say.

(Second Embodiment)

The above first embodiment was applied to an acceleration sensor. Next, an explanation will be made of use for a pressure sensor, using FIG. 8 to FIG. 11, in accordance with the process of manufacture.

Figure 8:
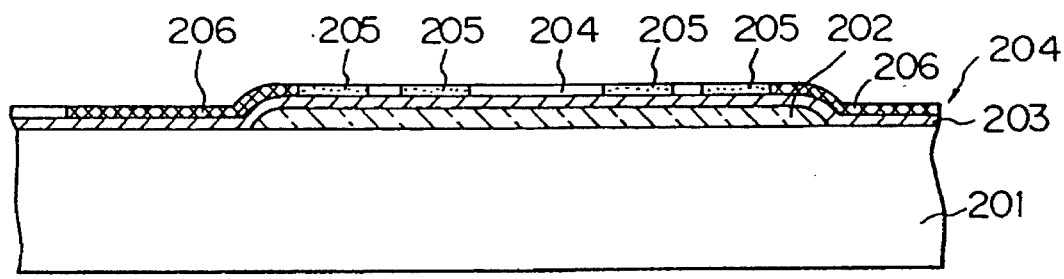
FIGS. 8 to 11 are sectional views of the manufacturing process for a second embodiment.

First, as shown in FIG. 8, for example, a PSG film 202 is coated to a thickness of 0.5 to 2 μm on the surface of an n-type Si substrate 201 having a specific resistance of 3 to 5 Ω·cm and a plane direction of (100) and then is photoetched to form a predetermined pattern of size serving as the diaphragm of the future pressure sensor (circular or rectangular). Next, this PSG film is raised to a temperature above the so-called softening point so as to make the PSG reflow and smooth the PSG film ends. Note that while this embodiment uses a PSG film, like the first embodiment use may also be made of an $SiO_2$ film. Next, the LPCVD method is used for forming a first $Si_3N_4$ film 203 to a thickness of 0.02 to 0.5 μm, then the LPCVD method is used to form a nondoped first polycrystalline silicon film 204, which is injected with ions to give an n-type conductivity. Further, boron ions are injected at a predetermined position so as to invert the conductivity and form a piezoresistor 205 and a high concentration diffusion layer 206 serving as the wiring layer (see FIG. 8). Note that the portions other than the piezoresistor 205 and the high concentration diffusion layer 206 are made the n-type in this embodiment, but may remain in the nondoped state as well.

Figure 9:
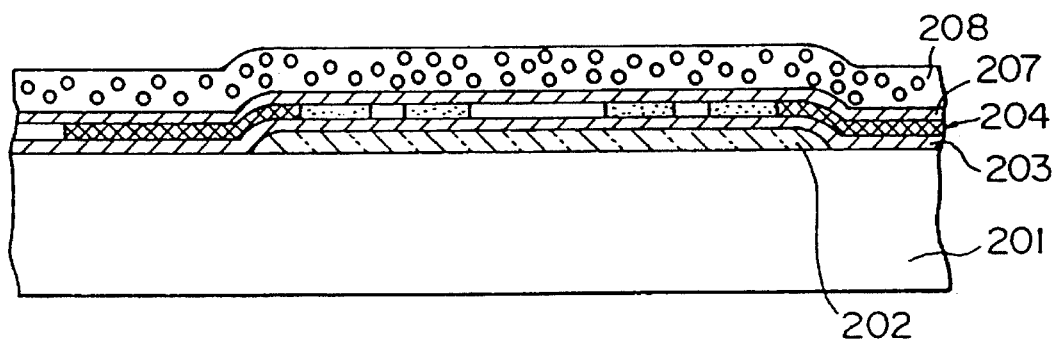
Figure 10:
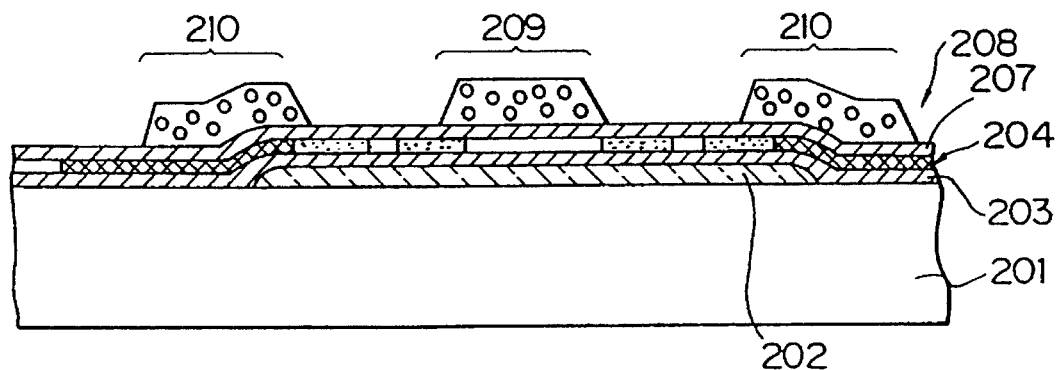

Next, as shown in FIG. 9, the LPCVD method is used to form the second $Si_3N_4$ film 207 to a thickness of 0.02 to 0.5 μm, then the LPCVD method is used to deposit a second polycrystalline silicon film 208 to a thickness of 0.5 to 20 μm. Then, photoetching is used, as shown in FIG. 10, to form a pattern of the second polycrystalline silicon film 208 left at the substantial center and peripheral portions of the position where the diaphragm is scheduled to be formed. The patterning of the second polycrystalline silicon film 208 results in the formation of the central portion polycrystalline silicon 209 and the peripheral portion polycrystalline silicon 210.

Figure 11:
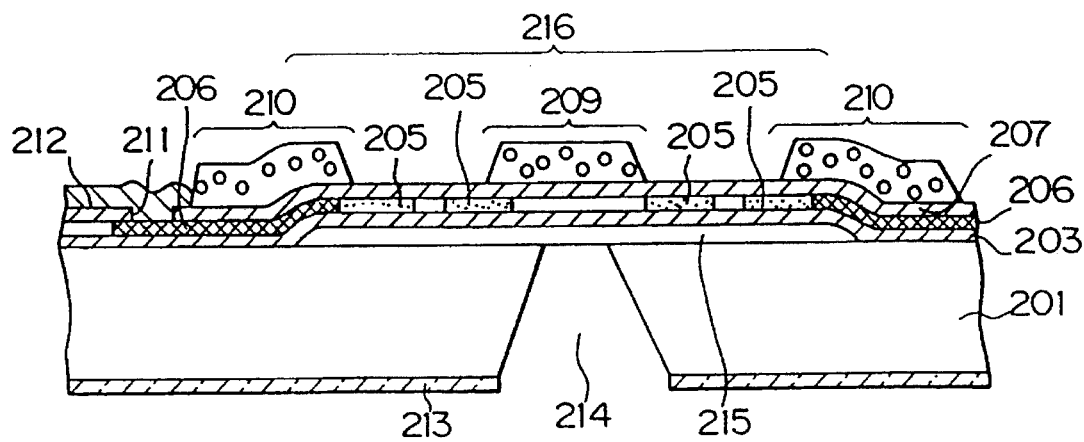

Next, a contact hole 211 for taking out the resistance changes of the piezoresistor 205 is opened in the second $Si_3N_4$ film 207 as shown in FIG. 11, and an Al wiring layer 212 is formed for electrically connecting to a not shown IC circuit portion. Next, a P-SiN film 213 is formed to a thickness of 0.5 to 2 μm on the reverse of the Si substrate 201, a predetermined pattern form, then, for example, alkali etching by KOH is used to etch from the reverse of the substrate and form a pressure introduction hole 214. This exposes the PSG film 202 at the reverse of the substrate. Next, an HF series etchant is used to selectively remove the PSG film 202 and form a cavity 215.

In this way, a pressure sensor is made with the diaphragm portion 216 made by the first $Si_3N_4$ film 203, the first polycrystalline silicon film 204, and the second $Si_3N_4$ film 207.

The pressure sensor of this embodiment has the thin diaphragm portion 216 raised in strength since its peripheral portion is firmly supported by the peripheral portion polycrystalline silicon 210 and, further, raised in stability with respect to application of excess pressure from the pressure introduction hole 214. Note that the embodiment shown in FIG. 11 ensures stabilization of the measurement accuracy and other output characteristics, as is well known, by the central portion polycrystalline silicon 209 and, further, has the central portion polycrystalline silicon 209 disposed so as to increase the stress on the piezoresistor 205 disposed at the center portion and so as to increase the stress on the piezoresistor disposed at the peripheral portion, thereby enabling detection of pressure with a good sensitivity.

Further, the present embodiment, like the first embodiment, has the cavity formed at the end of the wafer process, so enables stable manufacture in the wafer state and facilitates incorporation on the same chip as the IC circuit portion.

Figure 12:
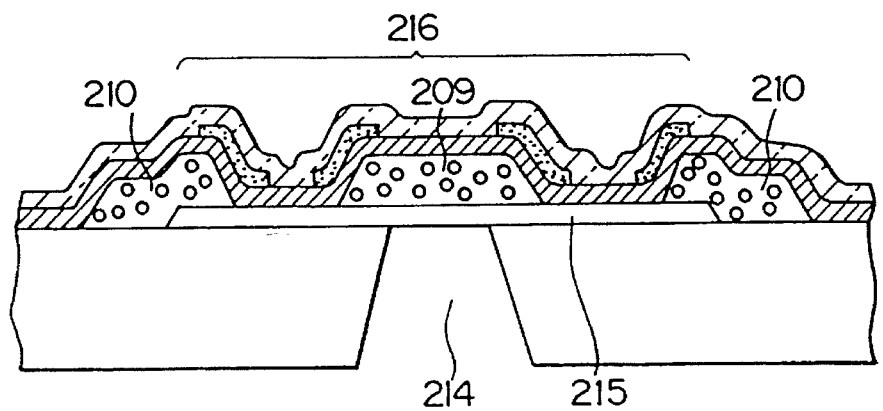
FIG. 12 is a sectional view showing another schematic construction of the second embodiment.

Note that the embodiment has the diaphragm portion affixed firmly at the peripheral portions thereof on the substrate by the thick support portion, but that various modifications are possible within the range where the object of the invention is achieved. For example, the present embodiment forms a central portion polycrystalline silicon 209 so as to increase the output and stabilize the characteristics, as mentioned above, but the method of manufacture shown in the embodiment may be used to make a pressure sensor not including this as well. Further, as shown in FIG. 12, the central portion polycrystalline silicon 209 and the peripheral portion polycrystalline silicon 210 may be made under the portion constituting the diaphragm portion 216 as well. This may be made by the same manufacturing method as explained for the first embodiment.

(Third Embodiment)

Next, a modification of the second embodiment wherein a stopper for limiting the amount of movement of the diaphragm portion 216 corresponding to the pressure applied from the pressure introduction hole 214, that is, a top stopper, is made so as to further increase the strength of the diaphragm portion will be explained, as a third embodiment, using FIG. 13 to FIG. 18.

Figure 13:
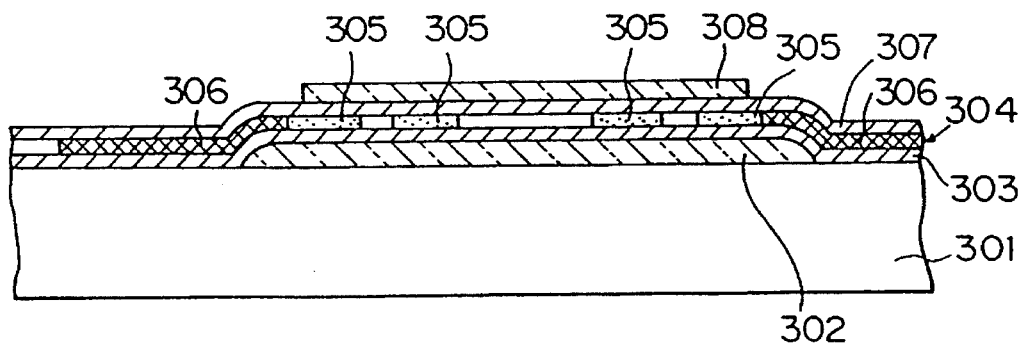
FIGS. 13 to 17 are sectional views of the manufacturing process for a third embodiment.

First, using the same process as explained in FIG. 8, an Si substrate 301 has formed thereon in predetermined configurations a first PSG film 302, first $Si_3N_4$ film 303, and a first polycrystalline silicon film 304 on which is formed a piezoresistor 305 and high concentration diffusion layer 306. Next, as shown in FIG. 13, a second $Si_3N_4$ film 307 is deposited in the same way as the first $Si_3N_4$ film 303 to a thickness of 0.02 to 0.5 μm, then a second PSG film 308 is formed to a region serving as the future diaphragm.

Figure 14:
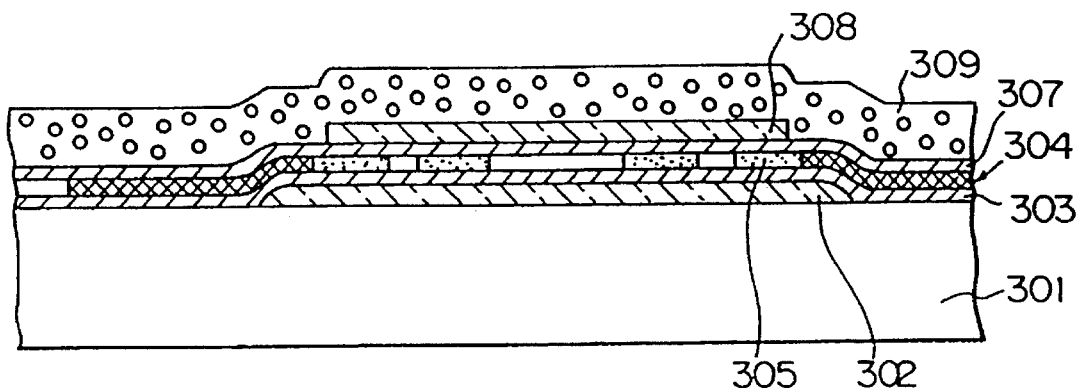
Figure 15:
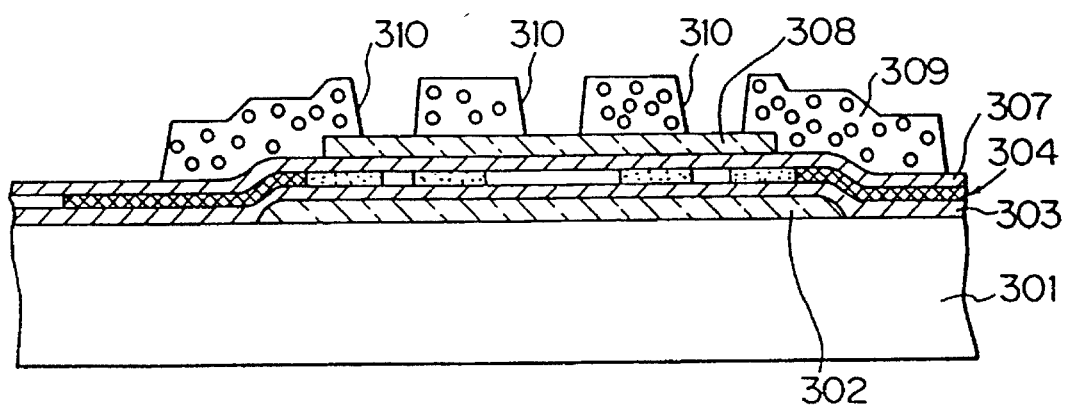
Figure 18:
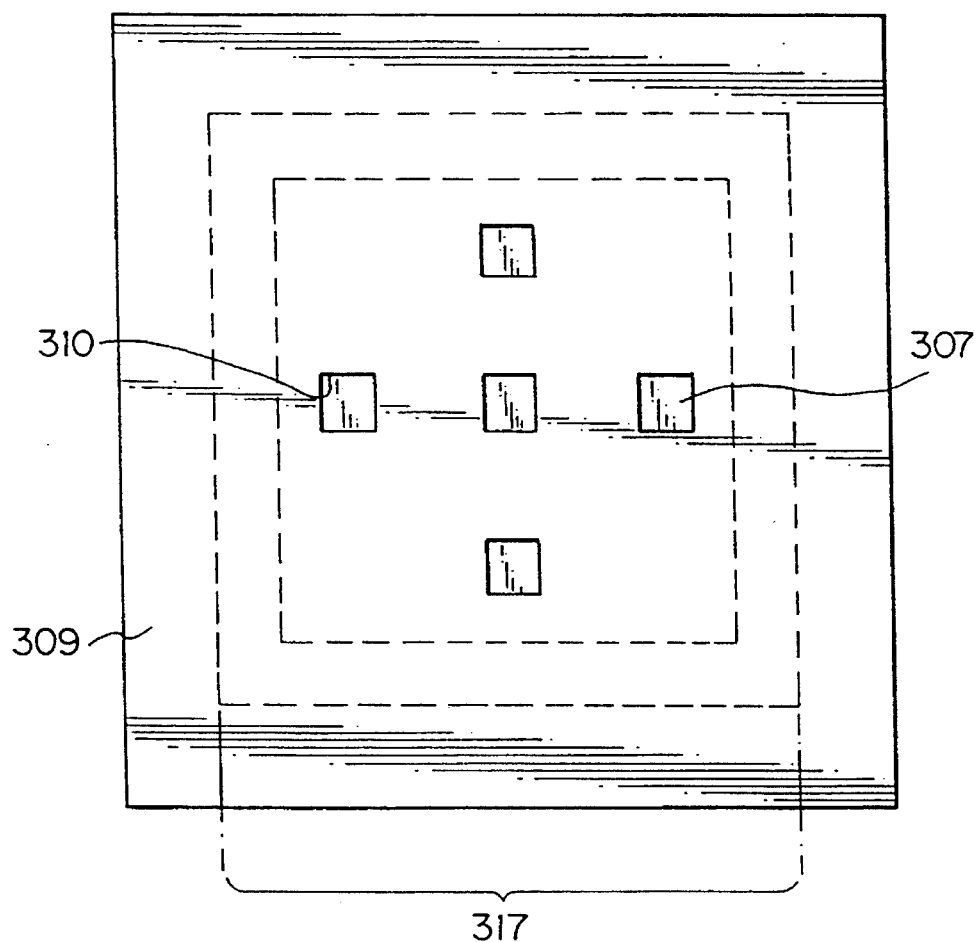
FIG. 18 is a plane view of the third embodiment.

Next, as shown in FIG. 14, the LPCVD method is used to deposit a second polycrystalline silicon film 309 to a thickness of about 0.5 to 50 μm, then as shown by the plane view of FIG. 18, photoetching is used to pattern the polycrystalline silicon film 309 to a predetermined shape for covering the portion to serve as the future diaphragm. Note that an etching hole 310 is opened in the polycrystalline silicon region left simultaneously with this etching (see FIG. 15 and FIG. 18) and that the etching hole 310 exposes the second PSG film 308.

Figure 16:
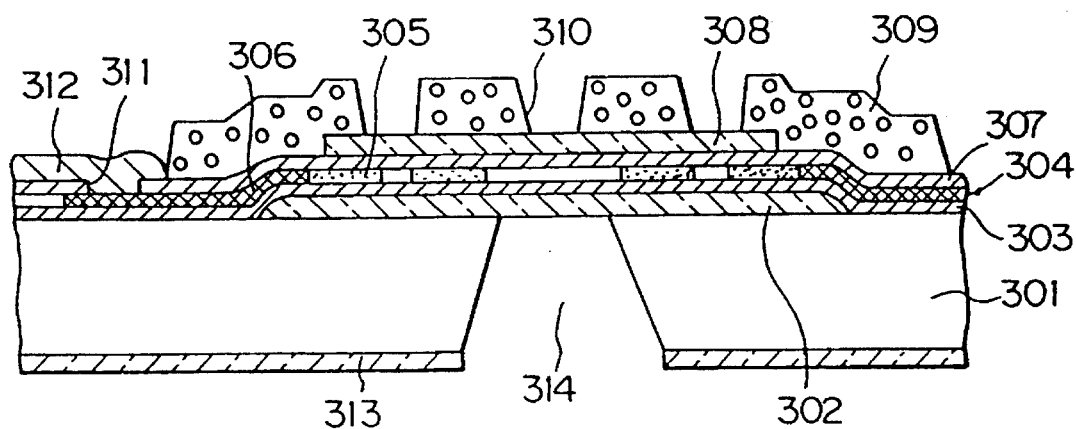
Figure 17:
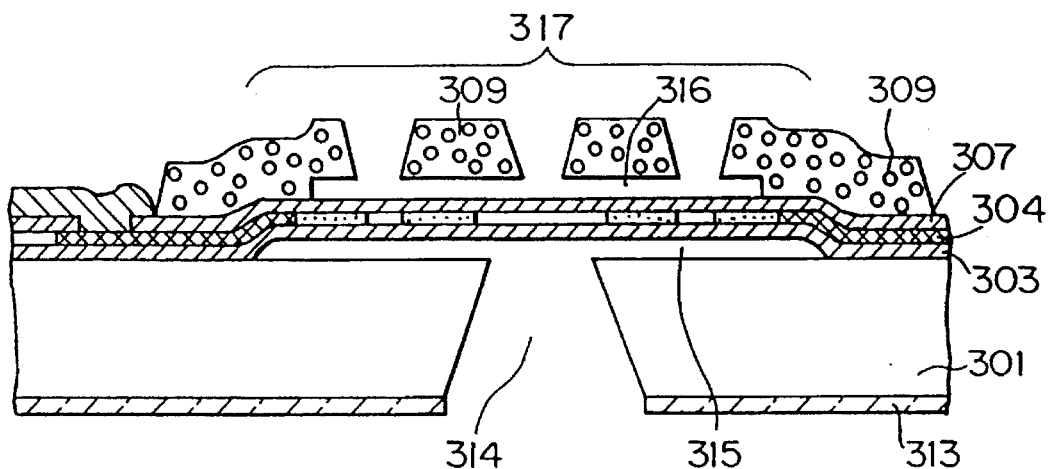

Next, a contact hole 311 for taking out the resistance changes of the piezoresistor 305 is opened in the second $Si_3N_4$ film 307 as shown in FIG. 16, and an Al wiring layer 312 is formed for electrically connecting to a not shown IC circuit portion. Next, a P-SiN film 313 is formed to a thickness of 0.5 to 2 μm on the reverse of the Si substrate 301, a predetermined pattern formed, then, for example, alkali etching by KOH is used to form a pressure introduction hole 314. This exposes the first PSG film 302 at the reverse of the substrate.

Next, an HF series etchant is used to selectively remove the first PSG film 302 and the second PSG film 308 from the reverse and surface of the substrate and form cavities 315 and 316.

The above forms a pressure sensor with the diaphragm portion 317 constituted by the first $Si_3N_4$ film 303, the first polycrystalline silicon film 304, and the second $Si_3N_4$ film 307. Note that the top stopper is formed by the polycrystalline silicon film 309 which supports the diaphragm portion 317 at its peripheral portion and that the gap distance from the diaphragm portion 317 to the top stopper is determined by the thickness of the second PSG film 308. Further, between the diaphragm portion 317 and the Si substrate 301 serving as the base is formed a gap determined by the thickness of the first PSG film 302. As mentioned above, this embodiment therefore enables the movable distance of the diaphragm portion 317 with respect to pressure applied from the pressure introduction hole 314 to be limited by the stopper.

Further, a stopper is formed at both the top and bottom sides of the diaphragm, so it is possible to deal with pressure applied from both directions, making application for a so-called relative pressure sensor possible.

Note that in the third embodiment shown in FIG. 18, the diaphragm was made rectangular, but the invention is not limited to this and it can, for example, be made circular as well.

(Fourth Embodiment)

Figure 19:
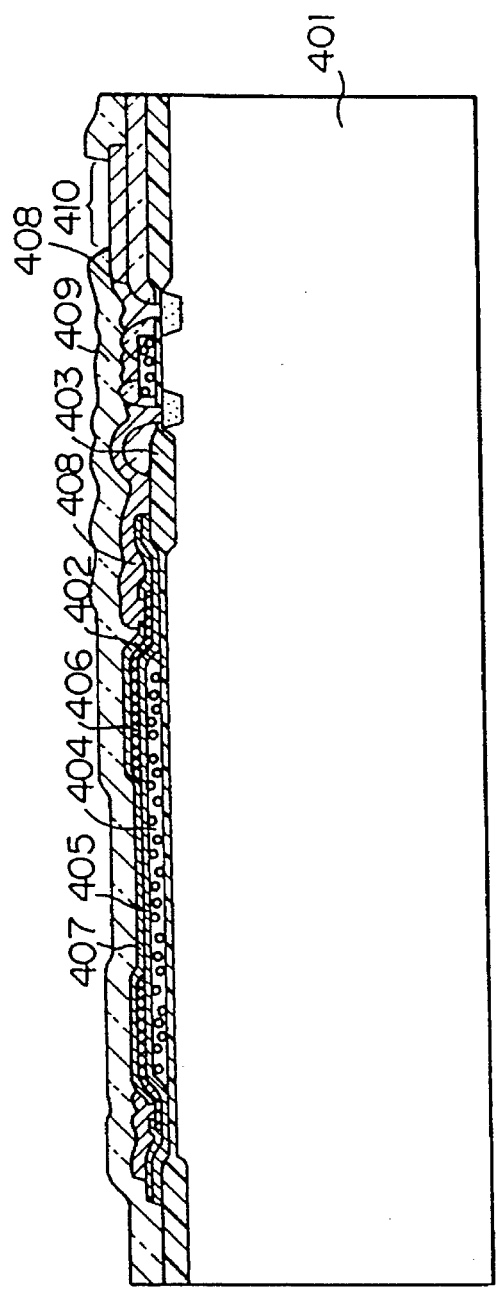
FIGS. 19 to 21 are sectional views of the manufacturing process for a fourth embodiment.
Figure 20:
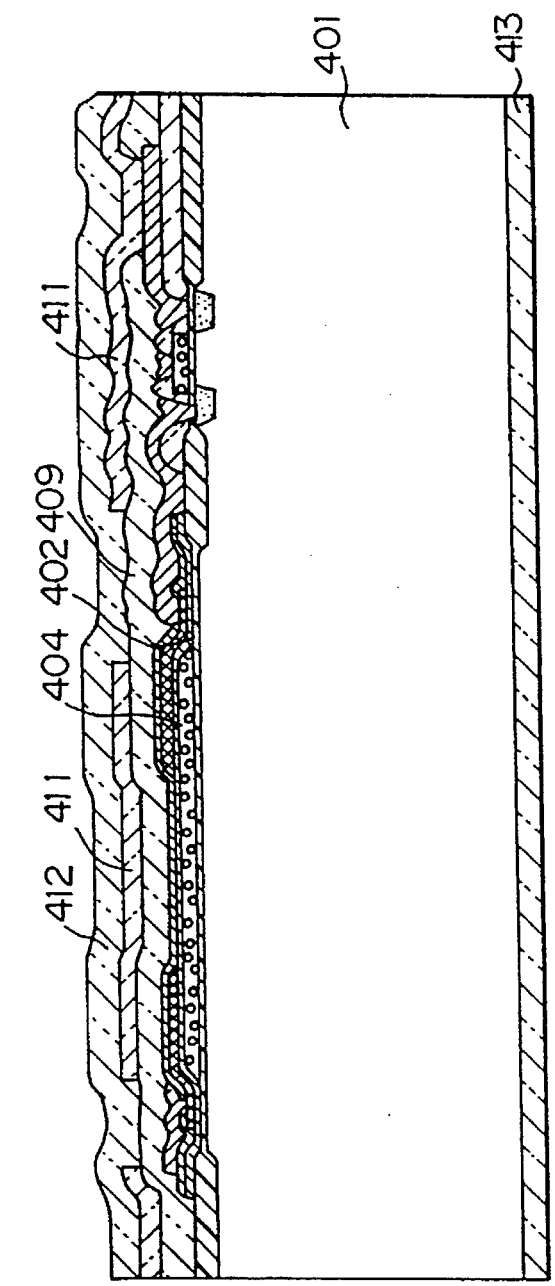
Figure 21:
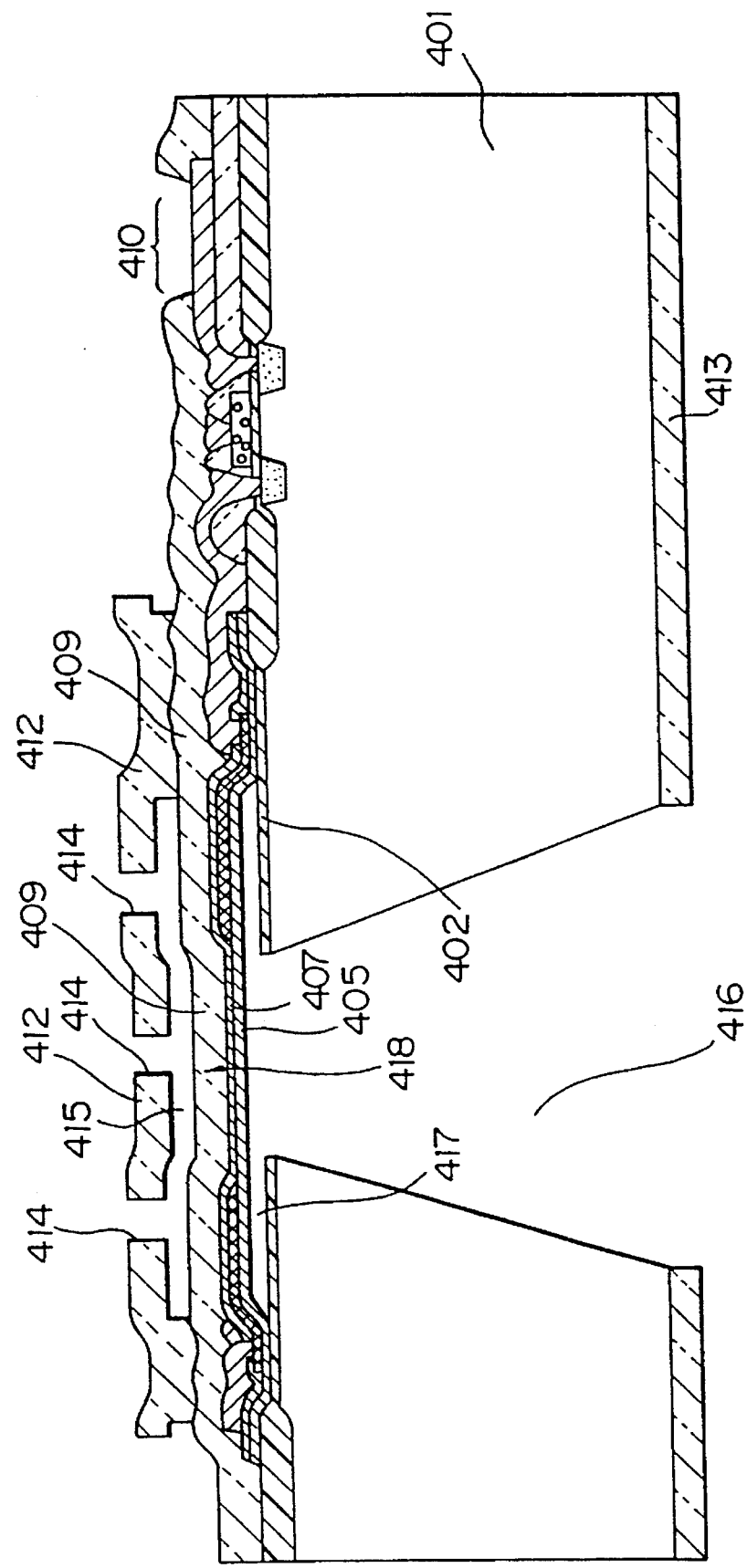

In the first to second embodiments mentioned above, the cavities were made by depositing an $SiO_2$ film or PSG film and selectively removing the same in a later process, but the filling material is not limited to $SiO_2$ or PSG and may be, for example, polycrystalline silicon as well. An example of the use of polycrystalline silicon is explained below, as the fourth embodiment, using FIG. 19 to FIG. 21. FIGS. 19 to 21 are sectional views of the manufacturing process showing one example of application of the invention to a pressure sensor. Note that in the explanation of the above embodiments, only the sensor portions were explained, but in this embodiment the explanation will be made of the IC circuit portion as well for processing the output signals from the sensor portion.

First, an $SiO_2$ film 402 is deposited on an Si substrate 401 by thermal oxidization etc. Next, the LOCOS method etc. is used to form a field oxide film 403, and the region serving as the future sensor portion and the region serving as the future IC circuit are delineated and separated. Next, a polycrystalline silicon film 404 of a predetermined thickness is deposited on the sensor portion region of the $SiO_2$ film 402 by the LPCVD method in a predetermined pattern configuration to serve as the future diaphragm (circular in this embodiment). At this time, as shown in FIG. 19, it is possible to simultaneously form the gate electrodes of MOSFETs etc. of the IC circuit portion. Next, an $Si_3N_4$ film 405, a polycrystalline silicon film 406 for constituting the piezoresistor etc., and an $Si_3N_4$ film 407 are successively formed on the sensor portion region of the polycrystalline silicon film 404. At the same time, the usual steps are taken to form the IC circuit portion and then predetermined contact holes are opened so as to form an Al wiring layer 408 in a predetermined pattern, whereby the sensor portion and the IC circuit portion are electrically connected as shown in FIG. 19. Next, a first P-SiN film 409 is deposited over the entire surface of the substrate for passivation, and pad portions 410 are formed for the predetermined wire bonding in the IC circuit portion (see FIG. 19).

Next, as shown in FIG. 20, the CVD method etc. is used to deposit a predetermined thickness of a PSG film 411, which is then patterned to a predetermined pattern configuration, then a predetermined thickness of a second P-SiN film 412 is deposited on the PSG film 411. On the other hand, a third P-SiN film 413 is deposited on the reverse of the substrate.

Next, as shown in FIG. 21, the second P-SiN film 412 is patterned to a predetermined pattern configuration so as to leave the second P-SiN film 412 on just the region serving as the diaphragm of the sensor portion. Further, the remaining second P-SiN film 412 is patterned in the same way to open, for example, a circular etching hole 414.

After this, an HF series etchant is used to selectively remove the PSG film 411 from the reverse surface of the substrate and form a cavity 415 in the sensor portion and to expose the bonding pads 410 of the IC circuit portion. Note that in the IC circuit portion, the above second P-SiN film 412 need only be patterned to enable the pad portions 410 for the wire bonding to be exposed at the surface of the substrate. There is no problem if the PSG film 411 and the second P-SiN film 412 remain at other regions. The patterning of the second P-SiN film 412 and the selective removal of the PSG film 411 to form the cavity 415 serve to form the peripheral support portion and the top stopper in the same way as with the third embodiment. Note that in the third embodiment, these were formed by polycrystalline silicon, but in this embodiment they are formed by the P-SiN film.

Next, the third P-SiN film 413 on the reverse of the substrate is used as a mask and the Si substrate 401 is subjected to anisotropic etching by KOH etc. from the reverse of the substrate so as to form a pressure introduction hole 416. Note that the SiO$_2$ film 402 serves as an etching stopper at this time. Then SiO$_2$ film 402 is then removed by an HF series etchant and then the polycrystalline silicon film 404 is etched away by a KOH solution. At this time, since the polycrystalline silicon film is polycrystalline in structure, the etching proceeds isotropically. The removal of the polycrystalline silicon film 404 from the reverse of the substrate results in the formation of the cavity 417. A diaphragm portion 418 is made comprised of the Si$_3$N$_4$ films 405 and 407 and the first P-SiN film 409.

As mentioned above, even if the filling material is polycrystalline silicon, it is possible to form cavities in good fashion with dimensions determined by the shape and thickness of the same. Further, the cavities, which tend to collect contaminants, dust, chemicals, etc. during the manufacturing process, are formed after the process for making the IC circuit portion, so can be made without fear of loss of stability of operation or reliability.

Note that in this embodiment the diaphragm portion 418 was made of the Si$_3$N$_4$ films 405 and 407 and the first P-SiN film 409, but that after the P-SiN film 409 is deposited, its surface may be smoothened at the time of the process shown in FIG. 19, so as to improve the uniformity of thickness of the diaphragm portion 418 and further improve the output characteristics.

Figure 22:
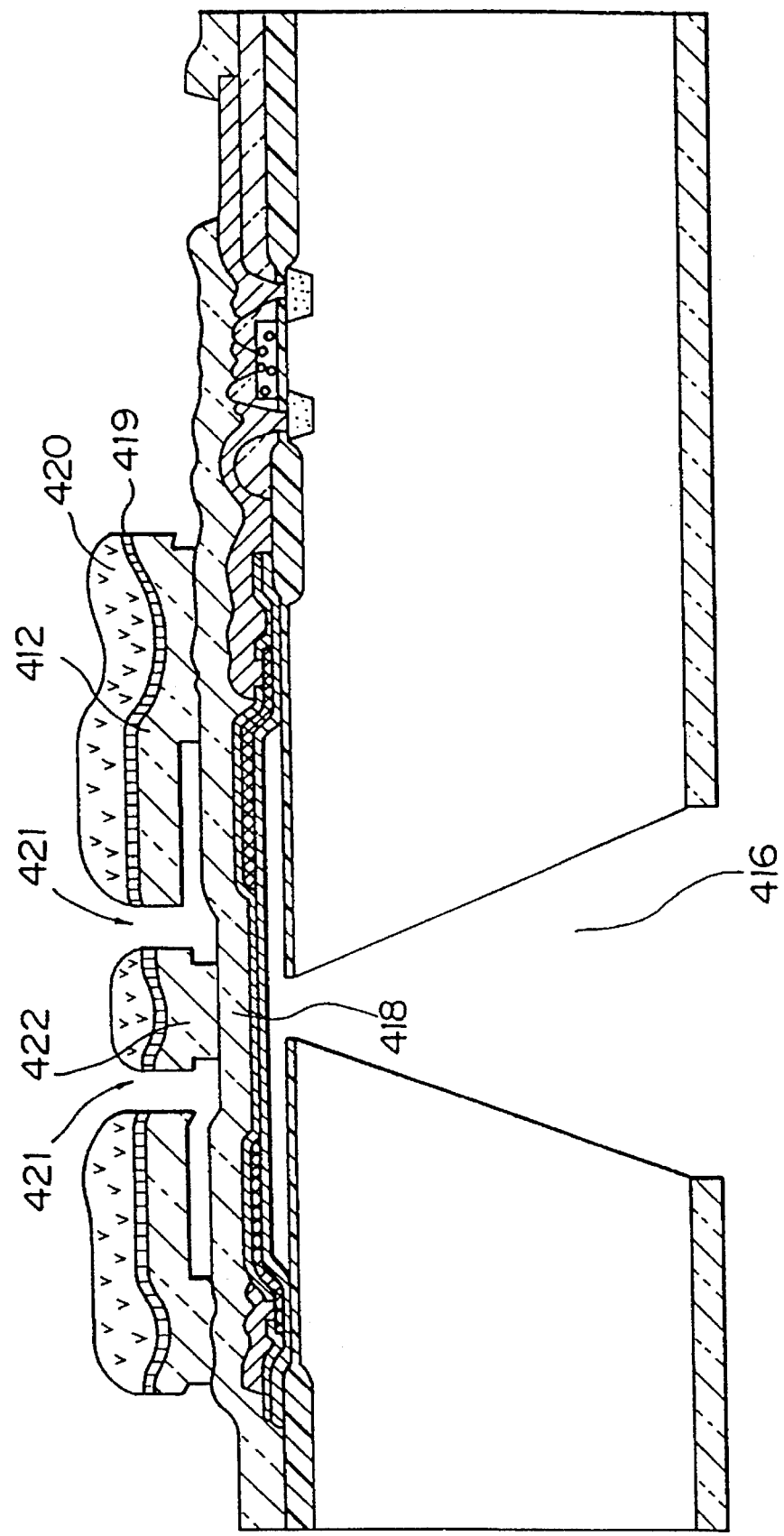
FIG. 22 is a sectional view showing another schematic construction of the fourth embodiment.

Further, various modifications of the present embodiment are possible. In the embodiment, for example, the diaphragm was made circular in shape, so by patterning the center portion of the PSG film 411 in a ring shape in the process shown in FIG. 20, depositing the second P-SiN film 412 as shown in FIG. 22, then forming on the surface a metal layer 419 of successively formed Ti, Ni, Au, etc. and a solder layer 420, opening a ring shaped hole 421, and removing the PSG film 411, it is possible to obtain a pressure sensor (see FIG. 2) having a fixing portion 422 at the center of the diaphragm portion 418. This sensor would have the diaphragm portion 418 firmly affixed at its periphery by the support portion formed by the P-SiN film 412, metal layer 419, and solder layer 420 and would have movement of the diaphragm portion 418 reliably stopped by the top stopper made of the same members. Note that the solder layer of the fixing portion 422 at the center of the diaphragm portion 418 need not be formed. Further, the fixing portion 422 may be used as a weight for an acceleration sensor as well.

In the above first to fourth embodiments, a thick support portion was provided at the connecting points of the strain generating portion and the substrate so as to reinforce the thin strain generating portion, but the sensitivity derives from the length of the strain generating portion as well, so below an explanation will be made of improvement of the sensitivity by lengthening the strain generating portion as much as possible within the limited region, using as an example an acceleration sensor.

(Fifth Embodiment)

FIGS. 23 to 32 are sectional views of the manufacturing process of a fifth embodiment. Below, an explanation will be made of the embodiment in accordance with the manufacturing process illustrated.

Figure 23:
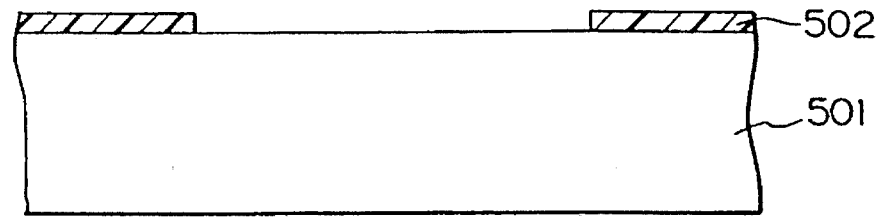
FIGS. 23 to 32 are sectional views of the manufacturing process for a fifth embodiment.

First, as shown in FIG. 23, a thermal oxidized SiO$_2$ film 502 of a thickness of 0.1 to 1 μm is formed in a predetermined pattern on an n-type Si substrate 501 with a specific resistance of 3 to 5 Ω·cm and a plane direction of (100).

Figure 24:
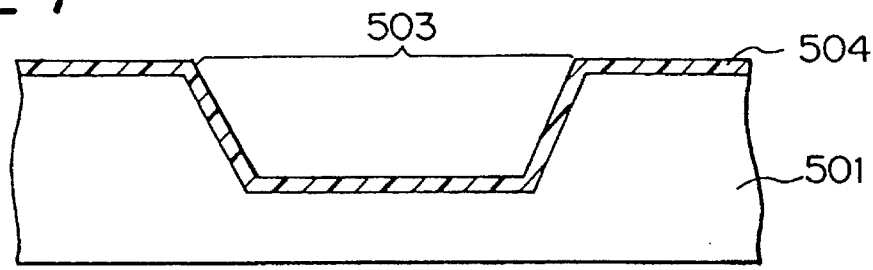
Figure 25:
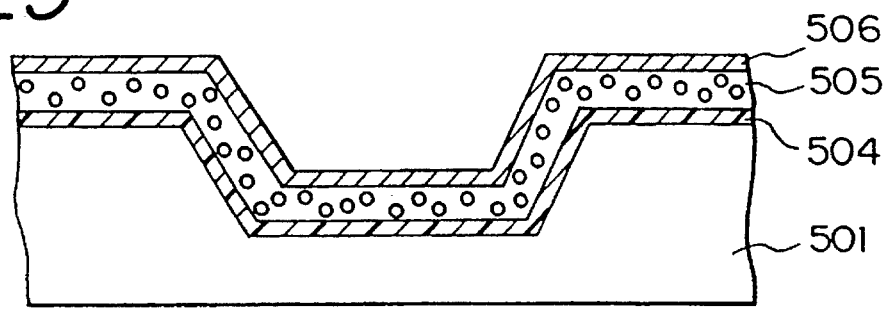
Figure 26:
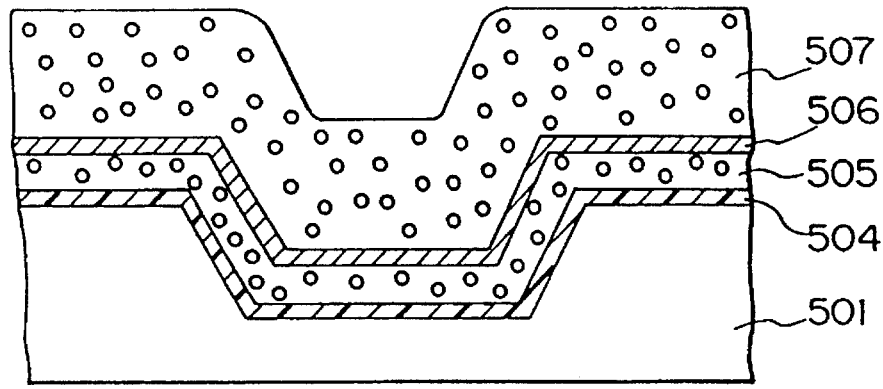
Figure 27:
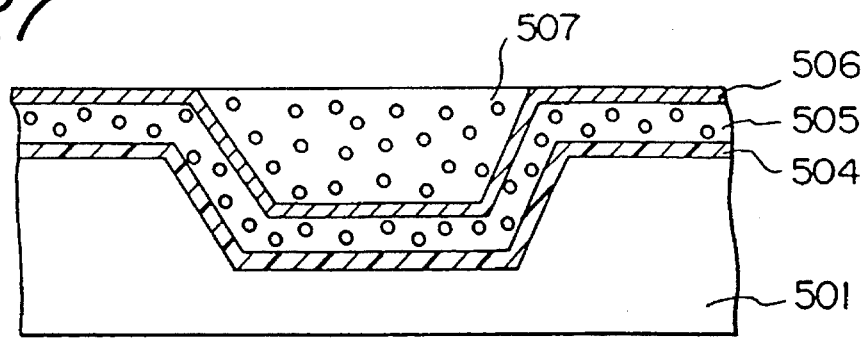

Then, the SiO$_2$ film 502 is used as a mask and alkali etching performed with, for example, a KOH solution, to form a depression 503 having a predetermined depth of 1 to 20 μm as shown in FIG. 24. Next, the SiO$_2$ film 502 is removed and an insulation film such as SiO$_2$ film 504 of a thickness of 0.1 to 2 μm is formed by thermal oxidation over the entire surface once again (see FIG. 24). The LPCVD method is then used to deposit a first polycrystalline silicon film 505 and then the LPCVD method is used to form an Si$_3$N$_4$ film 506 of a thickness of 0.1 to 1 μm (see FIG. 25). Further, as shown in FIG. 26, a second polycrystalline silicon film 507 is deposited and this second polycrystalline silicon film 507 is ground to smooth it and expose the Si$_3$N$_4$ film 506 at the surface as shown in FIG. 27.

Figure 28:
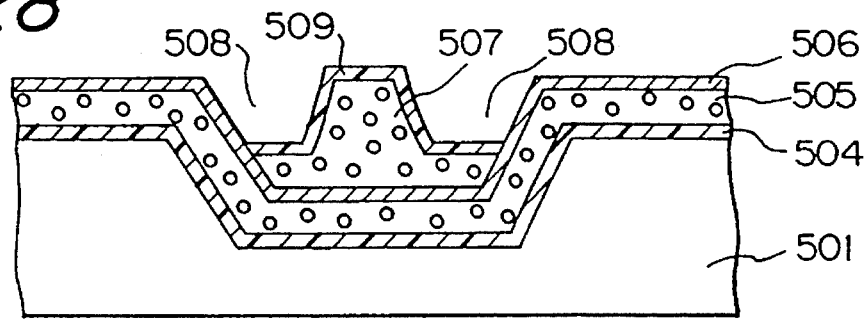
Figure 29:
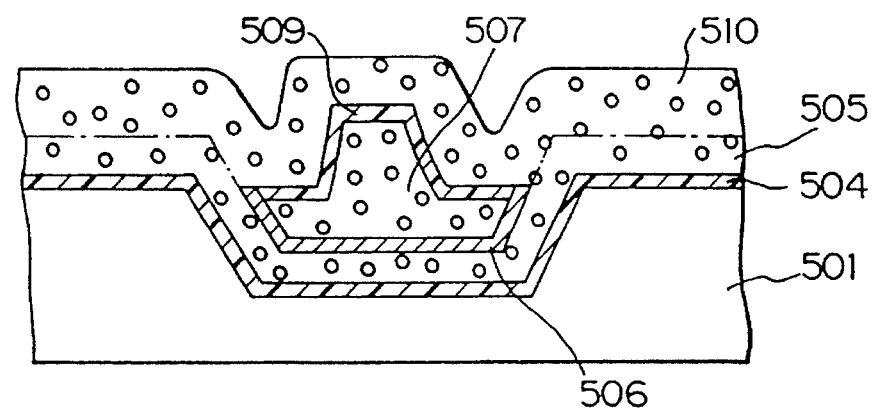
Figure 30:
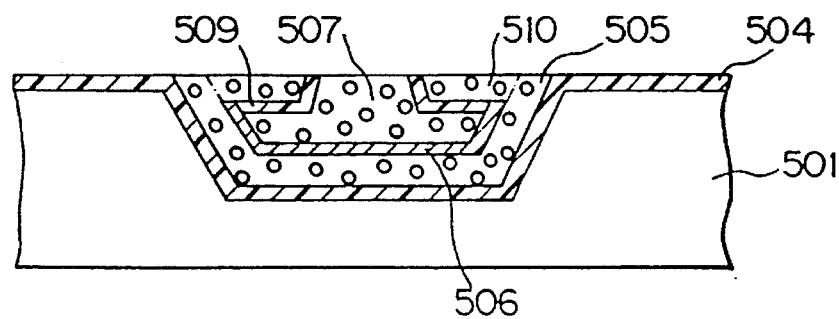
Figure 31:
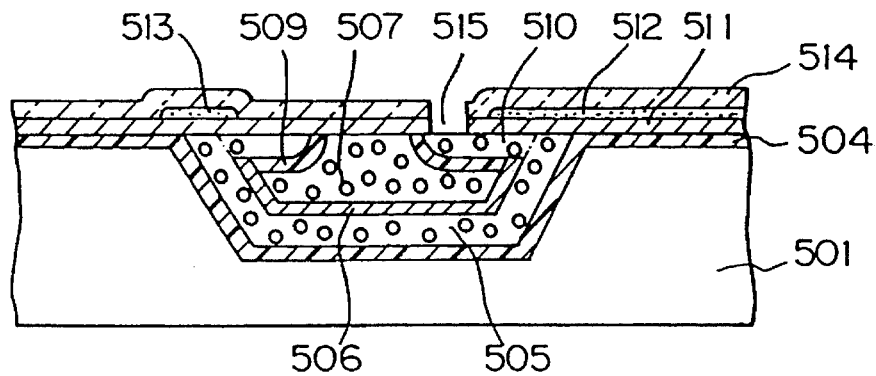

Next, as shown in FIG. 28, the second polycrystalline silicon film 507 is photoetched etc. to cut it away and form a depression 508 of a predetermined pattern at a predetermined region, then thermal oxidation is used to form an SiO$_2$ film 509 of a thickness of 0.1 to 2 μm at the surface of the second polycrystalline silicon film 507. The formation of this depression 508 determines the shape in the thickness direction of the weight of the acceleration sensor. Next, hot phosphoric acid is used to remove only the Si$_3$N$_4$ film 506 and then the LPCVD method is used to deposit a third polycrystalline silicon film 510 (see FIG. 29). After this, the third polycrystalline silicon film 510 is flattened by surface grinding until the SiO$_2$ film 504 appears at the surface as shown in FIG. 30.

Next, an IC circuit etc. for processing the output signals are formed by the usual IC manufacturing techniques at the peripheral portion, not shown, of the Si substrate 501, then an Si$_3$N$_4$ film 511 of a thickness of 0.1 to 1 μm is formed at the surface. Next, a polycrystalline silicon film 512 of a thickness of about 100 Å to 1 μm is deposited and a piezoresistor 513 is formed by the polycrystalline silicon film 512 at a predetermined position. The fore-mentioned not shown IC circuit portion is electrically connected by Al wiring, also not shown. After this, the CVD method is used to deposit a P-SiN film 514 over the entire surface to a thickness of 0.1 to 2 μm, then an etching groove 515 is formed in the P-SiN film 514 and the Si$_3$N$_4$ film 511 in a predetermined pattern so as to separate the regions serving as the beam and weight of the future acceleration sensor from the substrate 501 (see FIG. 31). Next, for example, alkali etching using a KOH solution etc. is used to selectively etch away the first polycrystalline silicon film 505 and the third polycrystalline silicon film 510, thereby making the acceleration sensor shown in FIG. 32.

Figure 32:
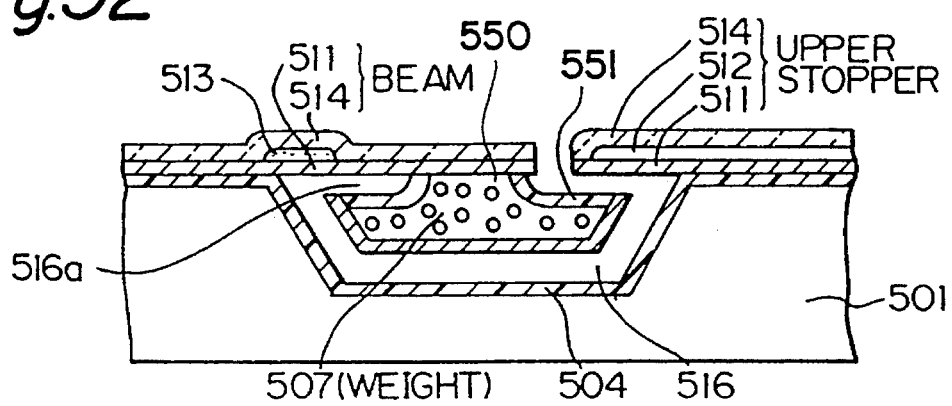
Figure 33:
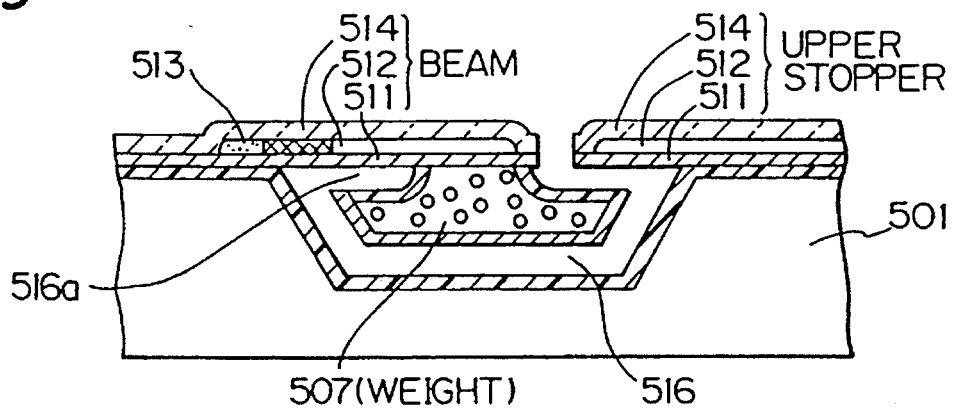
FIG. 33 is a sectional view showing another schematic construction of the fifth embodiment.

The acceleration sensor made in the above way, as shown in FIG. 32, has the beam portion and the top stopper formed simultaneously by the same material as the Si$_3$N$_4$ film 511 and the P-SiN film 514. That is, the top stopper can be fixed in position with good precision and can be made supersmall in size. Note that the top stopper may be increased in strength by leaving the polycrystalline silicon film 512 between the Si$_3$N$_4$ film 511 and the P-SiN film 514 at the time of formation of the piezoresistor 513. Further, as shown in FIG. 33, by leaving the polycrystalline silicon film 512 at the beam portion tool, the strength of the beam portion can be raised. Further, the weight has a connection portion 550 where it connects to the beam and has a flattened portion 551, caused by the surface grinding which forms a movement limiting surface. The acceleration sensor constituted by the second polycrystalline silicon film 507 is limited in its movable range in the vertical and lateral directions by the top stopper abutting against the flattened portion 551, and the substrate 501 abutting against the bottom surface of the weight. The size of the cavity 516 determining that movable range is set by the thickness of the third polycrystalline silicon film 510 an the first polycrystalline silicon film 505 selectively etched away in the final process.

Further, in this construction, it is possible to make a supersmall acceleration sensor with a weight filling in almost completely the depression 503 formed in the process shown in FIG. 24. Further, the cavity 516a above the weight, defined by the third polycrystalline silicon film 510, enables the connecting point of the weight and the beam to be shifted in the front edge direction of the beam, that is, enlarges the thin portion by the length determined by the cavity 516a, so a high sensitivity output can be obtained. That is, it is possible to make effective use of the small depressed cavity and raise the sensitivity. Note that the shape of the cavity 516a is determined by the pattern configuration of the depression 508 formed in the process shown in FIG. 28.

The cavity is formed at the end of the manufacturing process, so as mentioned in the various embodiments above, it is possible to stably pass the items to the next process in the wafer state.

Figure 34A:
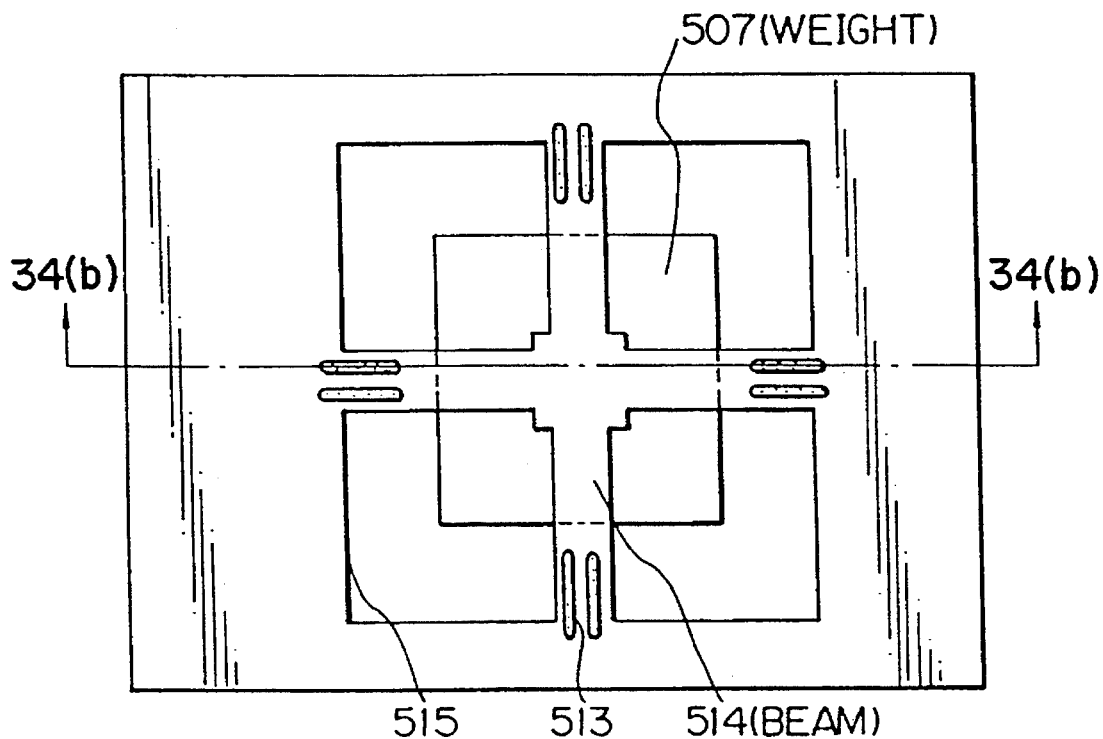
FIGS. 34(a) and (b) are other schematic structural views of the fifth embodiment, with FIG. 34(a) being a plane view and FIG. 34(b) being a cross-sectional view of the embodiment shown in FIG. 34(a) taken along line 34(b)—34(b)
Figure 34B:
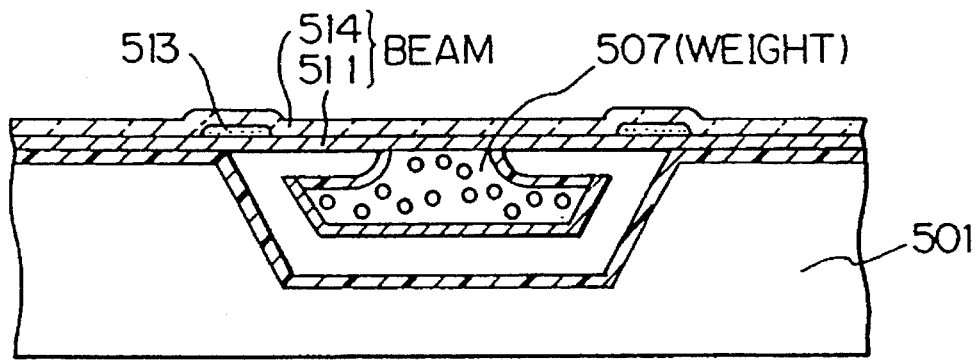
Figure 35A:
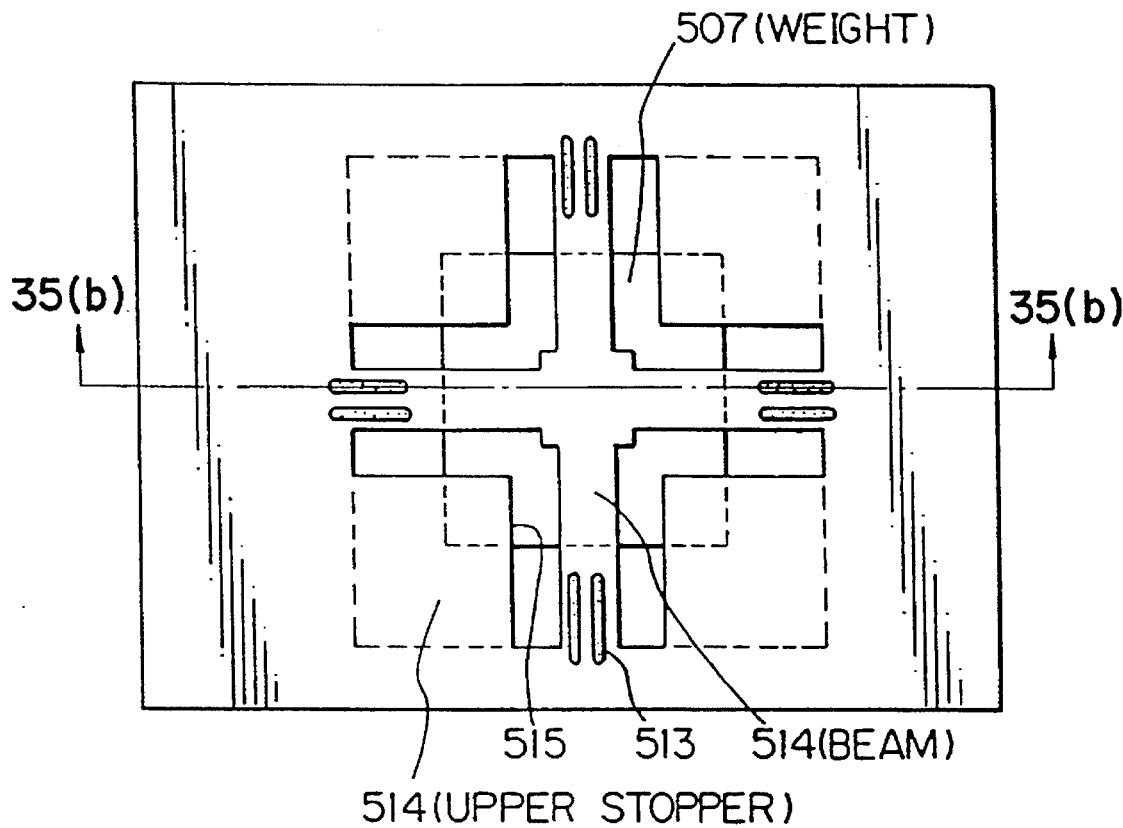
FIGS. 35(a) and (b) are plane and cross-sectional views, respectively, FIG. 35(b) taken along lines 35(b)—35(b) of FIG. 35(a)
Figure 35B:
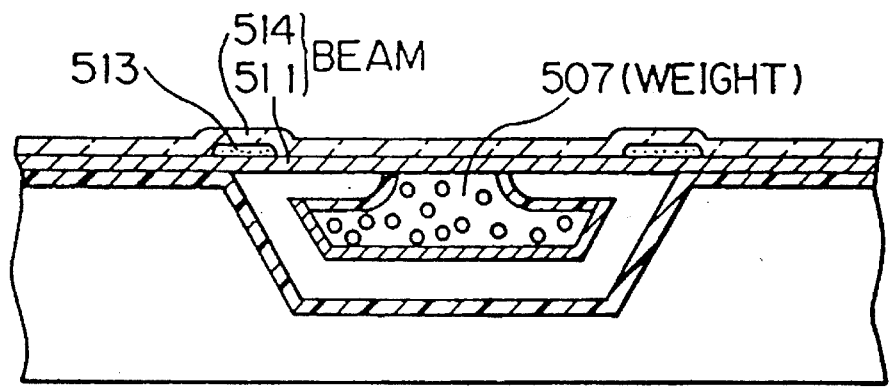

Note that the devices shown in FIG. 32 and FIG. 33 are of the cantilever type, but it is possible to provide support through a plurality of supports as well. FIGS. 34(a) and (b) show a four-directional support arrangement. FIG. 34(a) is a plane view and FIG. 34(b) is the A—A section of FIG. 34(a). In this device, the wall of the depression provided in the substrate 501 serves as the stopper for the movement of the weight in the downward or lateral directions. Further, FIGS. 35(a) and (b) show the device shown in FIG. 34(a) and (b) with a top stopper. Here, FIG. 35(a) is a plane view and FIG. 35(b) is an 35(b)—35(b) section of the device shown in FIG. 35(a). As will be understood from FIG. 34 and FIG. 35, the beam configuration and the existence and shape of the top stopper made of the same material as the beam ($Si_3N_4$ film 511 and P-SiN film 514) are determined by the pattern configuration of the etching groove 515 formed in the process shown in FIG. 31.

Figure 36A:
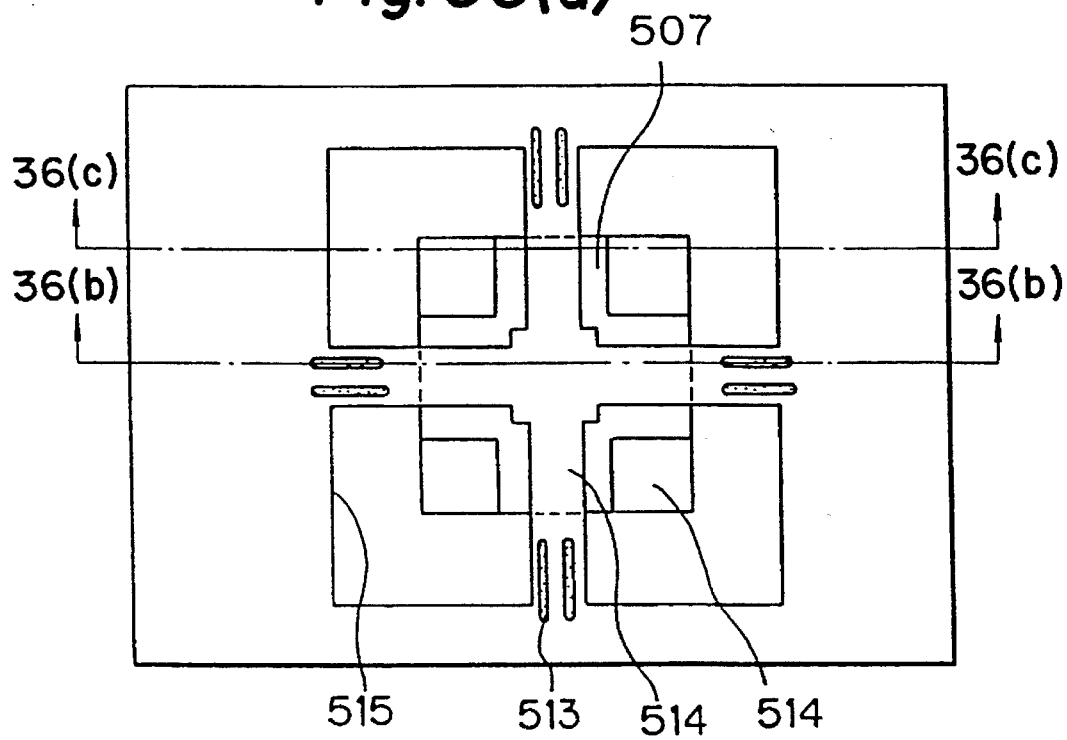
FIGS. 36(a) to (c) are other schematic structural views of the fifth embodiment, with FIG. 36(a) being a plane view, FIG. 36(b) being a cross-sectional view of the embodiment shown in FIG. 36(a) taken along line 36(b)—36(b)
Figure 36B:
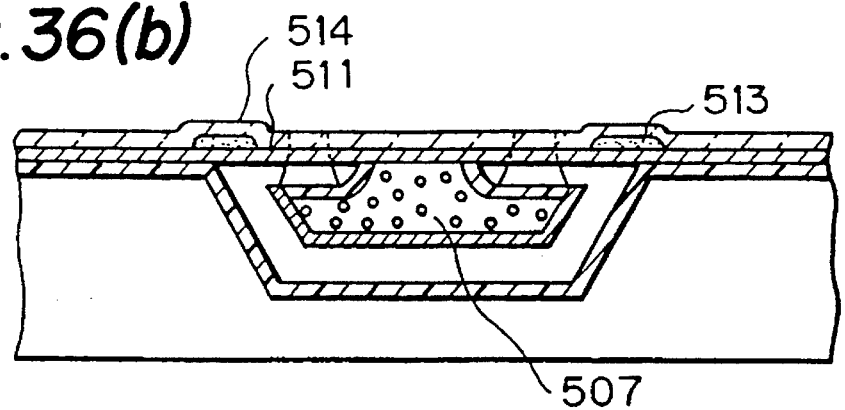
Figure 36C:
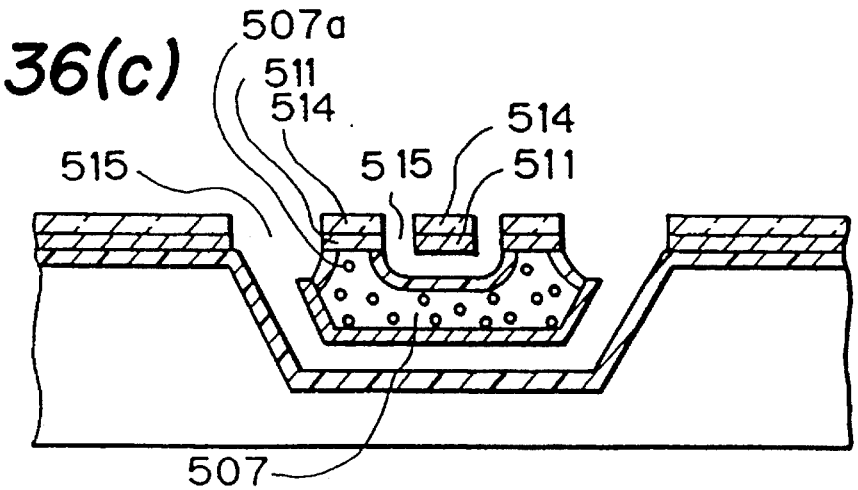

FIGS. 36(a) to (c) show an example of the device shown in FIGS. 34(a) and (b) with the addition of a weight at the peripheral portion of the weight for raising the sensitivity. Note that FIG. 36(a) is a plane view and that its 36(b)—36(b) section and 36(c)—36(c) section are shown in FIGS. 36(b) and (c). The added weight 507(a) is comprised of the second polycrystalline silicon film 507a, the $Si_3N_4$ film 511, and the P-SiN film 514. These may be made by changing the pattern configuration of the depression 508 in the process shown in FIG. 28 an the pattern configuration of the etching groove 515 in the process shown in FIG. 31.

Figure 37C:
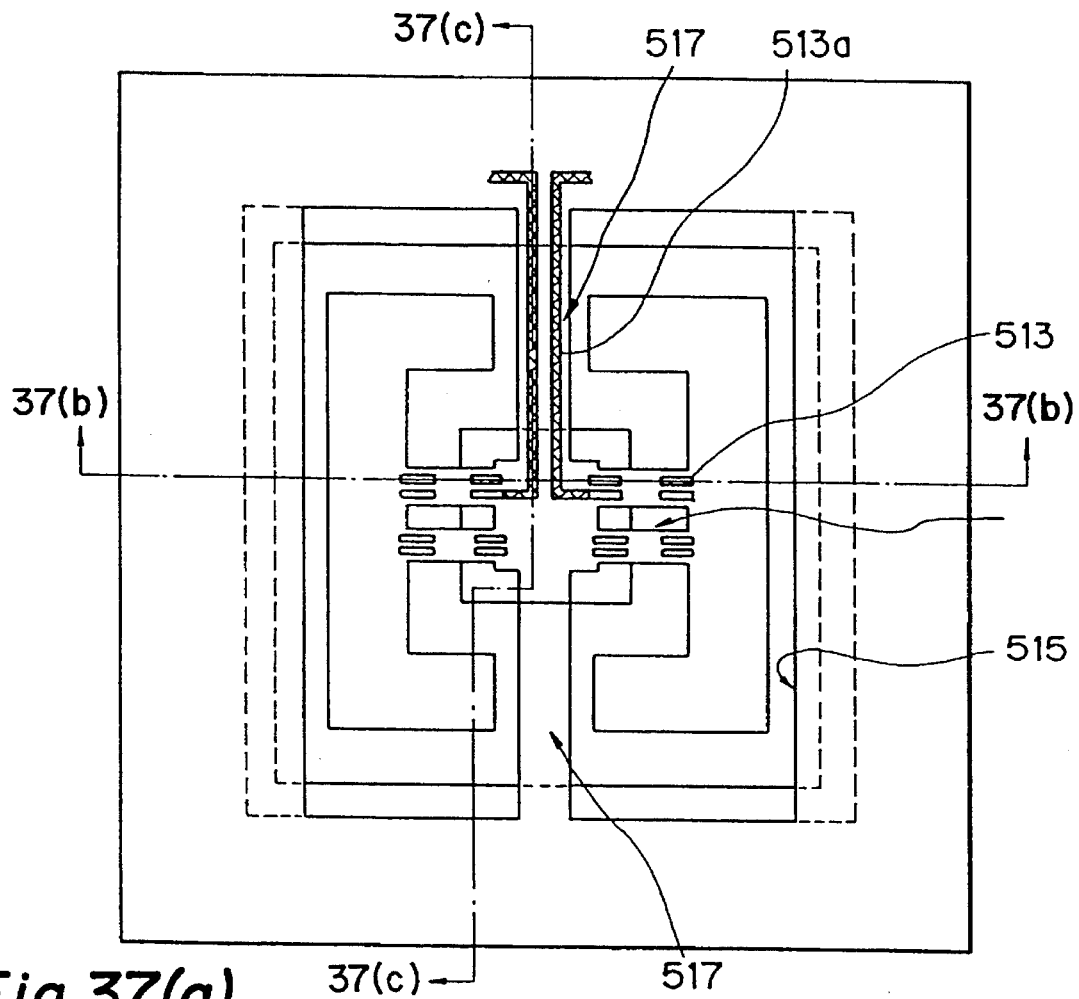
FIGS. 37(a) to (c) are other schematic structural views of the fifth embodiment, with FIG. 37(a) being a plane view, FIG. 37(b) being a cross-sectional view of the embodiment shown in FIG. 37(a) taken along line 37(b)—37(b), and FIG. 37(c) being a cross-sectional view of the embodiment shown in FIG. 37(a) taken along line 37(c)—37(c)
Figure 37A:
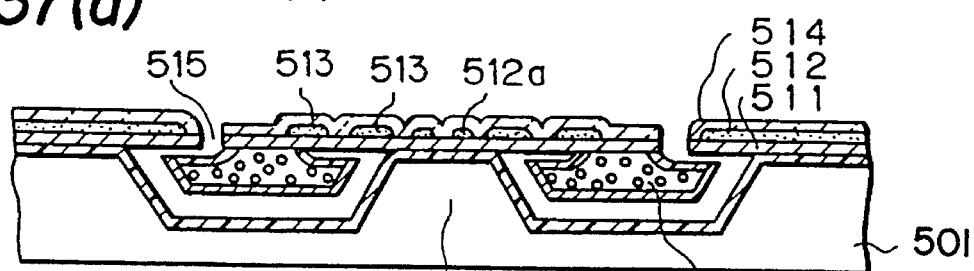
Figure 37B:
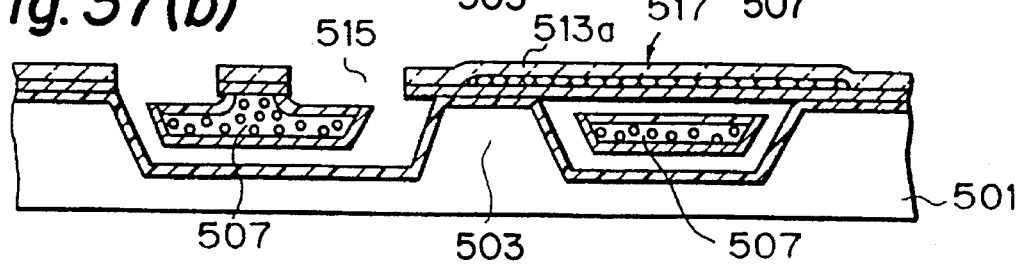

Next, FIGS. 37(a) to (c) show a device with a protrusion formed at the center of the depression formed in the substrate 501 and with a weight 507 formed in a rectangular ring like fashion in the depression around the protrusion. Note that FIG. 37(a) is a plane view and its 37(b)—37(b) section and 37(c)—37(c) section are shown respectively in FIGS. 37(b) and (c). This device has the weight and beam of the acceleration sensor supported at the center protrusion 503 and enables reliable prevention of twisting of the beam due to emphasis of the weight in any one direction and, further enables further improvement of the sensitivity. Note that this device may be made by just modifying the pattern configuration of the $SiO_2$ film 502 etc. in the process shown in FIGS. 23 to 32. Further, the takeout portion 517 of the wiring 513a from the piezoresistor 513 is set by the pattern configuration of the etching groove 515 and may be formed simultaneously by the same members as with the beam and top stopper. Further, the wiring takeout portion 517 functions also as a top stopper. Note that the wiring 513a is made of the high concentration diffusion layer comprised of polycrystalline silicon the same as the piezoresistor 513, but use may also be made of wiring of Al etc.

Note that in the above fifth embodiment, the filler material selectively removed to form the beam and weight of the acceleration sensor was polycrystalline silicon the same as in the fourth embodiment, but use may also be made of $SiO_2$ or PSG as shown in the first to third embodiments. Next, an explanation will be made of an example of use of PSG, as a sixth embodiment, in accordance with the manufacturing process shown in FIGS. 38 to 42(a) to (c).

(Sixth Embodiment)

Figure 38:
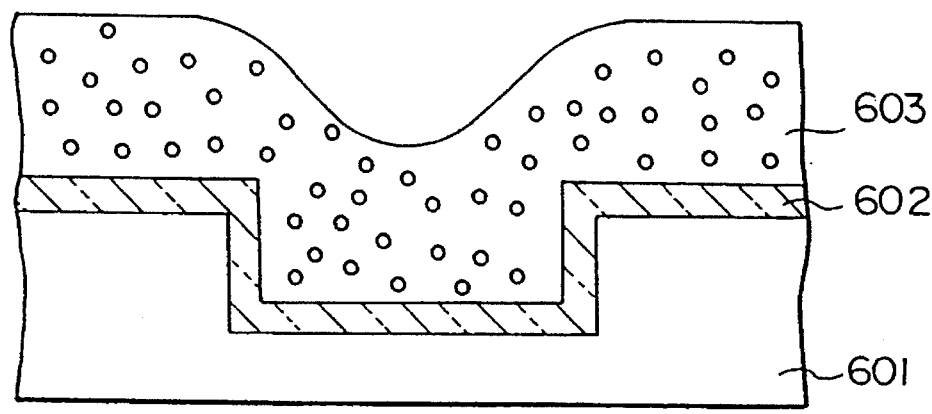
FIGS. 38 to 41 and FIGS. 42(a) to (c) are sectional views of the manufacturing process of a sixth embodiment, with FIG. 42(a) being a plane view, FIG. 42(b) being a cross-sectional view of the embodiment shown in FIG. 42(a) taken along line 42(b)—42(b), and FIG. 42(c) being cross-sectional view of the embodiment shown in FIG. 42(a) taken along line 42(c)—42(c)
Figure 39:
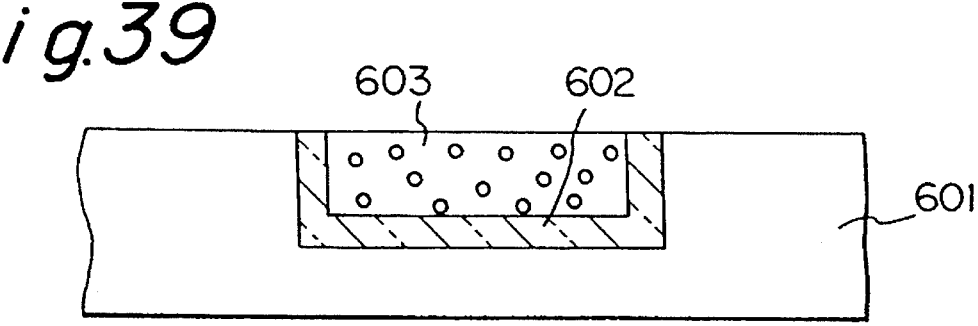
Figure 40:
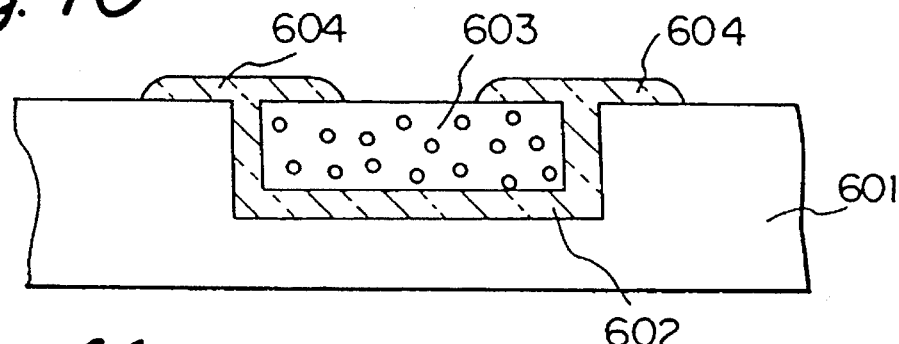

First, as shown in FIG. 38, a depression of a predetermined configuration is formed in an Si substrate 601, then a first PSG film 602 is formed to a predetermined thickness, then a polycrystalline silicon film 603 is deposited to fill in the depression. Next, as shown in FIG. 39, the surface is ground to smooth the surface. Then, a second PSG film 604 is formed to a predetermined thickness and a predetermined pattern configuration, then as shown in FIG. 40 is made to reflow so as to improve the step coverage and thereby smooth the end portions.

Figure 41:
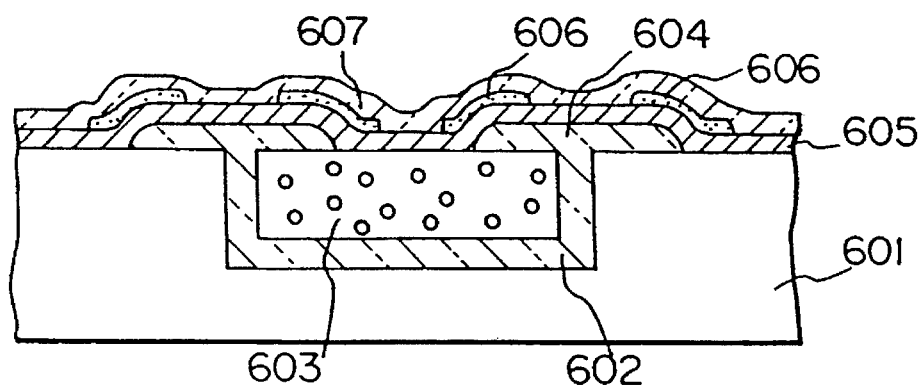
Figure 42A:
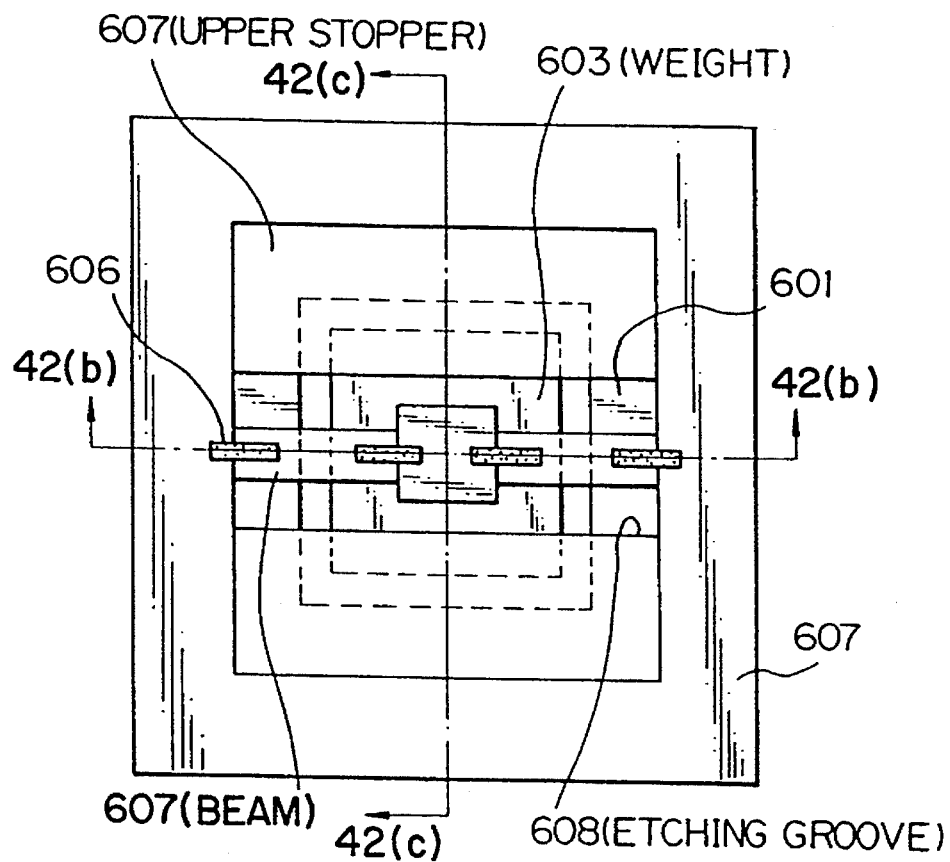
Figure 42B:
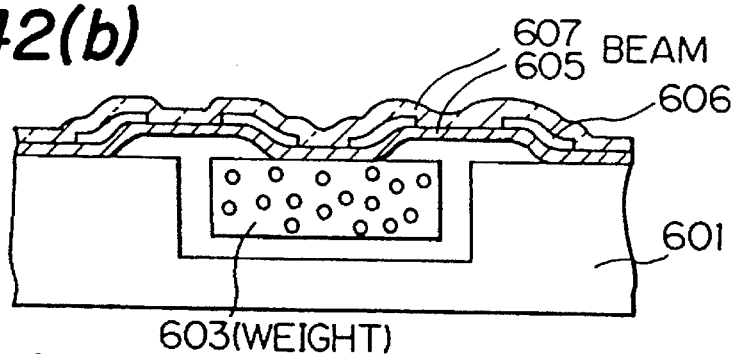
Figure 42C:
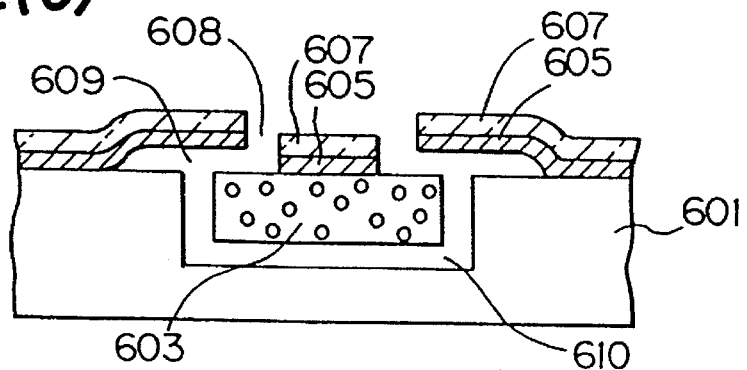

Next, in the same way as in the above various embodiments, as shown in FIG. 41, a $Si_3N_4$ film 605, a piezoresistor 606 made by polycrystalline silicon, Al wiring (not shown) electrically connecting the not shown IC circuit portion and the piezoresistor 606, and a P-SiN film 607 are successively formed. Then, as shown in FIGS. 42(a) and (c), the P-SiN film 607 and $Si_3N_4$ film 605 are patterned to predetermined configurations to form an etching groove 608. This etching groove 608 sets the regions serving as the beam and the top stopper of the future acceleration sensor. Then, an HF series etchant is used to selectively remove the second PSG film 604 and the first PSG film 602 and, as shown in FIGS. 42(a) to (c), form the cavities 609 and 610. The weight comprised of the polycrystalline silicon film 603 is formed and supported in a movable manner by the beam comprised by the $Si_3N_4$ film 605 and the P-SiN film 607.

In the above way, the acceleration sensor according to this embodiment has the beam and the top stopper constituted simultaneously by the same member. The movable range of the weight comprised of the polycrystalline silicon film 603 is set by the thickness of the first PSG film 603 and the second PSG 604. Further, the substrate 601 acts as a stopper for movement in downward direction or the lateral direction of the weight.

Note that in a device using PSG as a filler material, various modifications are possible as mentioned with respect to the fifth embodiment, needless to say.

Further, even in the fifth and sixth embodiments, it is possible to provide a thick support portion as reinforcement at the connecting portion of the substrate and the beam, as in the first to fourth embodiments.

Figure 43:
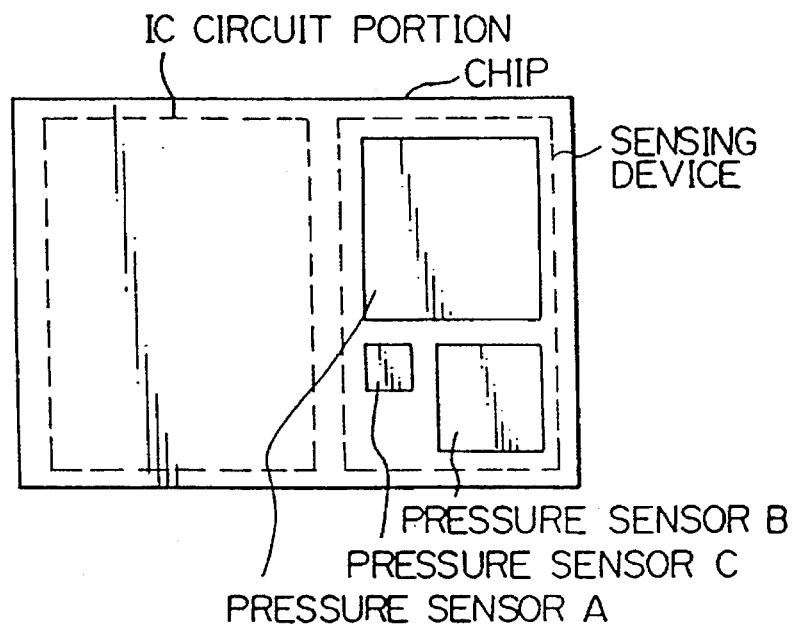
FIG. 43 is a structural view of the layout on a chip.
Figure 44:
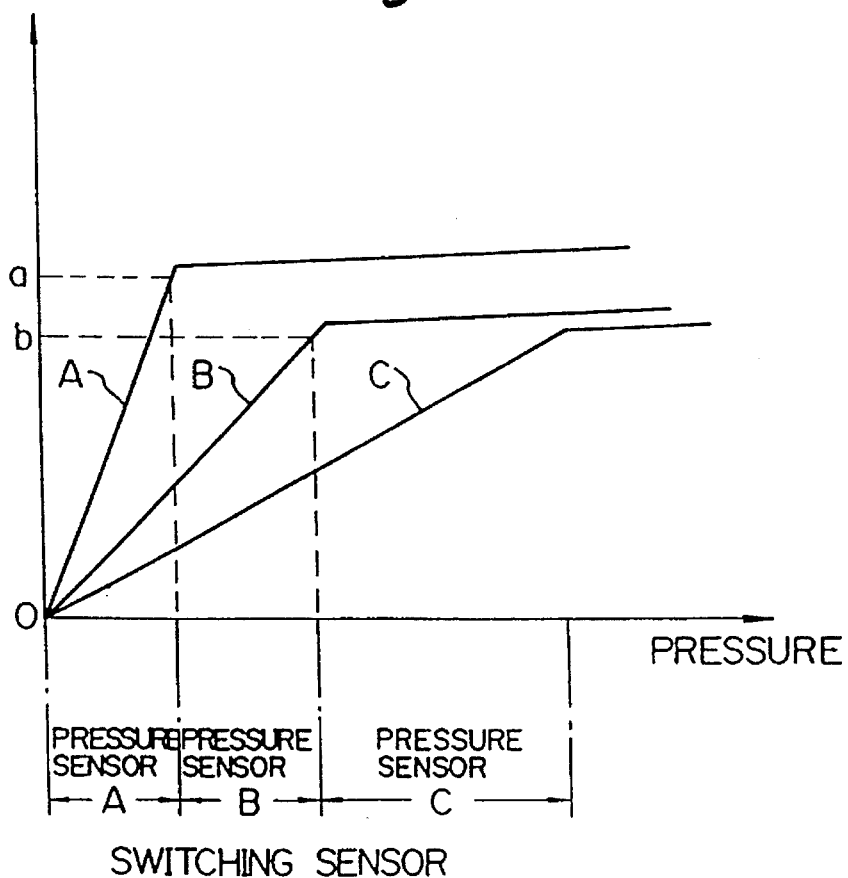
FIG. 44 is a graph for explaining the wide range structure.

As explained in detail in the first to sixth embodiments, according to the present invention, it is possible to incorporate on the same substrate as an IC circuit a supersmall strain sensing device comprised of a beam, diaphragm, or other thin portion, a stopper for limiting the amount of displacement by the thin portion upon receiving stress, etc. Further, even when formed of a very small size, the strength of the thin portion can be ensured and a high sensitivity can be realized. Further, by modifying the pattern configuration or thickness, it is possible to make various types of devices with different sensitivities simultaneously and on the same substrate with a good precision, so a "wide range" construction enabling measurement over a wide range of strains is possible. For example, explaining this using the pressure sensors shown in the third and fourth embodiments, these devices have stoppers with respect to the direction of displacement of the diaphragm, so, as shown in FIG. 43, it is possible to incorporate a plurality of pressure sensors with different diaphragms on the same chip as an IC circuit portion and therefore possible to measure pressures of a low to high level in accordance with the diaphragm sizes. That is, in this case, devices with large diaphragm sizes handle the detection of low pressures, with the stoppers of the diaphragms preventing breakage of the diaphragms if receiving high pressures. The pressure is thus successively measured by being detected by diaphragms of smaller sizes (see FIG. 44). Note that the switching among detection of pressure by the plurality of diaphragms is performed under the control of the IC circuit portion incorporated on the same chip. For example, as shown in FIG. 44, they may be switched upon detection of a turning point in the output characteristics from the diaphragms, that is, the point of actuation of the stoppers of the diaphragms. Note that in FIG. 44, the characteristic lines A, B, and C are the output characteristics from the pressure sensors A, B, and C shown in FIG. 43. Note that in the wide range construction shown in FIG. 43, a plurality of devices with different diaphragm sizes are disposed, but one may also dispose devices with different diaphragm thicknesses. Further, this wide range construction may, needless to say, be applied to an acceleration sensor as well. In the case of an acceleration sensor, one need only arrange devices with different beam lengths, thicknesses, etc. In particular, the devices shown in the fifth and sixth embodiments may be changed in beam length, leaving the sensor regions the same, which is effective layout-wise in the sensor deployment.

As explained above, the strain sensing device of the present invention has the superior effects of enabling a high sensitivity even with the sensor device made small in size and of enabling prevention of breakage of the strain generating portion.

Further, the method of manufacture of the present invention has films successively deposited on the semiconductor substrate without forming cavities in the semiconductor substrate and forms the final strain sensing device by patterning and selective removal, so the method of manufacture of the present invention has the superior effect of enabling the manufacture of a strain sensing sensor in a small size and with good precision.

We claim:

1. A strain sensing device comprising:

a substrate consisting essentially of one substance, said substrate having a depression defined in a main surface thereof, said substrate including side walls and a bottom wall defining said depression;

a weight filling in almost all of said depression, said weight having side walls and a bottom wall and being set inside said depression so that substantially an entire area of each of said side walls of said weight and substantially an entire area of said bottom wall of said weight are substantially parallel with said side walls and bottom wall of said substrate defining said depression, respectively, so that contact between said substantially entire area of side walls of said weight and said side walls of said substrate defining said depression limits lateral movement of said weight, and so that contact between said substantially entire area bottom wall of said weight and said bottom wall of said substrate defining said depression limits downward movement of said weight, said weight also having a connecting portion on an upper surface thereof;

a beam extending from said substrate for supporting said weight in said depression and being connected to said weight at said connecting portion of said weight;

a strain sensing element for detecting an amount of displacement of said weight and provided on said beam; and an upper stopper member provided on an upper surface of said substrate for limiting upward movement of said weight, wherein a lower surface of said upper stopper member facing said depression and a lower surface of said beam facing said depression are fabricated concurrently with one another and made from a same material, and wherein a cavity is defined between said upper surface of said weight and a portion of a length of said beam extending from a contacting point formed between said beam and said substrate and said connecting portion of said weight, a distance of said beam from said contacting point to said connecting portion of said weight being dependent on a size of said cavity, and wherein a thickness of said connecting portion of said weight is thicker than a thickness of a portion of said weight adjacent said cavity.

2. A strain sensing device according to claim 1, wherein said side walls and said bottom wall of said substrate defining said depression are covered with an insulation film.

3. A strain sensing device according to claim 1, wherein said side walls and said bottom wall defining external surfaces of said weight opposite to said side walls and said bottom wall of said depression formed on said substrate are covered with an insulation film.

4. A strain sensing device according to claim 2, wherein said side walls and said bottom wall defining external surfaces of said weight opposite to said side walls and said bottom wall of said depression formed on said substrate are covered with an insulation film.

5. A strain sensing device according to claim 1, wherein said strain sensing element comprises a piezoresistor element provided on said beam.

6. A strain sensing device according to claim 1, wherein said weight includes a movement limiting portion defined on an upper surface of said weight, a thickness of said movement limiting portion of said weight being thinner than that of said connecting portion of said weight, and wherein said upper stopper member is arranged above said movement limiting portion of said weight, said upper stopper member extending from a peripheral portion of said depression.

7. A strain sensing device according to claim 1, further comprising an additional weight located in an area on an upper surface of said weight, except for an area opposing a lower surface of said beam.

8. A strain sensing device according to claim 1, wherein said beam is supported by both ends on said substrate and said weight is connected to a central portion of said beam.

9. A strain sensing device according to claim 6, wherein said beam is supported by both ends on said substrate and said weight is connected to a central portion of said beam.

10. A strain sensing device according to claim 7, wherein said beam is supported by both ends on said substrate and said weight is connected to a central portion of said beam.

11. A strain sensing device according to claim 8, wherein at least two beams intersect with each other at a substantially right angle to form a four-directional support arrangement.

12. A strain sensing device according to claim 9, wherein at least two beams intersect with each other at a substantially right angle to form a four-directional support arrangement.

13. A strain sensing device according to clam 10, wherein at least two beams intersect with each other at a substantially right angle to form a four-directional support arrangement.

14. A strain sensing device according to claim 1, wherein said substrate is made of semiconductor material.

15. A strain sensing device comprising:
  a substrate consisting essentially of one substance, said substrate having a depression defined in a main surface thereof, said substrate including side walls and a bottom wall defining said depression;
  a weight filling in almost all of said depression, said weight having side walls and a bottom wall and being set inside said depression so that said side walls and said bottom wall thereof are substantially parallel with said side walls and bottom wall of said substrate defining said depression respectively, said weight also having a connecting portion on an upper surface thereof;
  a beam extending from said substrate for supporting said weight in said depression and being connected to said weight at said connecting portion of said weight;
  a strain sensing element for detecting an amount of displacement of said weight and provided on said beam;
  a protrusion extending from said substrate, said protrusion being located inside said depression at a substantially central portion thereof, said weight being arranged so as to surround said protrusion, said beam supporting said weight at both end portions of said beam and a center portion of said beam being fixed to said protrusion,
  wherein a cavity is defined between said upper surface of said weight and a portion of a length of said beam extending from a contacting point formed between said beam and said substrate and said connecting portion of said weight, a distance of said beam from said contacting point to said connecting portion of said weight being dependent on a size of said cavity, and wherein a thickness of said connecting portion of said weight is thicker than a thickness of a portion of said weight adjacent said cavity.

16. A strain sensing device according to claim 15, further comprising a wiring having a takeout portion that extends laterally over said weight to thereby define a bridge between said protrusion and a peripheral portion of said depression.

17. A strain sensing device according to claim 16, wherein said weight includes a movement limiting portion defined on an upper surface of said weight, a thickness of said movement limiting portion of said weight being thinner than that of said connecting portion of said weight, said strain sensing device further comprising an upper stopper means arranged above said movement limiting portion of said weight, said upper stopper means extending from a peripheral portion of said depression, wherein a lower surface of said stopper means corresponds to a surface in which a lower surface of said beam is formed.

18. A strain sensing device according to claim 17, wherein a distance between a lower surface of said takeout portion of said wiring and an upper surface of said weight opposing said lower surface of said takeout portion of said wiring is identical to a distance between a lower surface of said upper stopper means and a surface of said movement limiting portion of said weight so that said takeout portion of said wiring serves as another upper stopper means.

19. A strain sensing device according to claim 16, wherein an upper surface of said weight opposing said takeout portion of a wiring is covered with an insulating film.

20. A strain sensing device comprising:
  a substrate consisting essentially of one substance, said substrate having a ring-shaped depression formed at a main surface thereof, said ring-shaped depression being defined by walls of said substrate;
  a ring-shaped weight almost completely filling in said depression;
  a beam supporting said weight inside said depression, said beam being fixed to a protrusion located inside said depression formed in said substrate, wherein a cavity is defined between an upper surface of said weight and a lower surface of said beam and
  a semiconductor strain sensing element disposed on said beam and which detects an amount of strain of said beam by displacement of said ring-shaped weight.

21. A strain sensing device according to claim 20, wherein said substrate is made of a semiconductor substance.

22. A strain sensing device according to claim 21, wherein at least one of said walls of said substrate defining said depression are covered with an insulation film.

23. A strain sensing device according to claim 22, wherein at least one external surface of said weight opposing said walls of said substrate defining said depression are covered with an insulation film.

24. A strain sensing device according to claim 20, wherein a takeout portion of a wiring is provided so as to laterally extend over said weight to thereby define a bridge between said protrusion and a peripheral portion of said depression.

25. A strain sensing device according to claim 24, wherein said weight includes a movement limiting portion defined on an upper surface of said weight, a thickness of said movement limiting portion of said weight being thinner than that of a connecting portion of said weight at which said weight is connected to said beam, said strain sensing device further comprising an upper stopper means arranged above said movement limiting portion of said weight, said upper stopper means extending from a peripheral portion of said depression, and wherein a lower surface of said upper stopping means corresponds to a surface in which a lower surface of said beam is formed.

26. A strain sensing device according to claim 23, further comprising a wiring including a takeout portion extending laterally over said weight to thereby define a bridge between said protrusion and a peripheral portion of said depression.

27. A strain sensing device according to claim 26, wherein an upper surface of said weight opposing said takeout portion of a wiring is covered with an insulating film.

* * * * *